(12) United States Patent
Yang

(10) Patent No.: US 11,735,849 B2
(45) Date of Patent: Aug. 22, 2023

(54) ELECTRICAL CONNECTOR MANUFACTURING METHOD

(71) Applicant: ALL BEST PRECISION TECHNOLOGY CO., LTD., Taoyuan (TW)

(72) Inventor: Haven Yang, Taoyuan (TW)

(73) Assignee: ALL BEST PRECISION TECHNOLOGY CO., LTD., Taoyuan (TW)

( * ) Notice: Subject to any disclaimer, the term of this patent is extended or adjusted under 35 U.S.C. 154(b) by 57 days.

(21) Appl. No.: 17/401,277

(22) Filed: Aug. 12, 2021

(65) Prior Publication Data

US 2023/0052180 A1 Feb. 16, 2023

(51) Int. Cl.
| | |
|---|---|
| H01R 12/73 | (2011.01) |
| H01R 12/70 | (2011.01) |
| H01R 12/72 | (2011.01) |
| G06F 13/40 | (2006.01) |

(52) U.S. Cl.
CPC ....... *H01R 12/737* (2013.01); *H01R 12/7082* (2013.01); *H01R 12/724* (2013.01); *G06F 13/409* (2013.01); *G06F 2213/0026* (2013.01)

(58) Field of Classification Search
CPC .. H01R 12/732; H01R 12/737; H01R 12/722; H01R 12/724; H01R 12/727; H01R 12/712; H01R 12/716; H01R 12/7082; H01R 12/707; H01R 43/0256; H01R 43/02; H01R 43/0263; G06F 13/409
USPC ....................................................... 439/541.5
See application file for complete search history.

(56) References Cited

U.S. PATENT DOCUMENTS

| | | | | |
|---|---|---|---|---|
| 5,887,344 A | * | 3/1999 | Sinclair | H05K 7/1084 439/70 |
| 6,805,278 B1 | * | 10/2004 | Olson | H01R 12/707 439/83 |
| 6,860,741 B2 | * | 3/2005 | Ashman | H05K 13/0465 439/70 |
| 6,928,727 B2 | * | 8/2005 | Ashman | H01R 43/24 228/180.1 |
| 7,261,591 B2 | * | 8/2007 | Korsunsky | H01R 12/727 439/541 |
| 7,578,696 B2 | * | 8/2009 | Yuan | H01R 13/447 439/485 |

(Continued)

*Primary Examiner* — Marcus E Harcum
(74) *Attorney, Agent, or Firm* — Winston Hsu

(57) ABSTRACT

An electrical connector includes an insulation housing, a plurality of rows of terminals, and a plurality of corresponding fixing parts. The plurality of rows of terminals are sequentially and fixedly arranged in parallel on the insulation housing. The plurality of fixing parts are assembled to the insulation housing for structurally constraining the corresponding rows of terminals. An electrical connector manufacturing method includes fixing a plurality of first terminals on an insulation housing in a row, assembling a first fixing part to the insulation housing to structurally constrain the row of first terminals, fixing a plurality of second terminals on the insulation housing in a row, assembling a second fixing part to the insulation housing to structurally constrain the row of second terminals, and so on, so as to obtain one like the above electrical connector. The electrical connector can provide data transmission in compliance with PCIe 4.0 standard.

7 Claims, 22 Drawing Sheets

(56) References Cited

U.S. PATENT DOCUMENTS

| | | | | |
|---|---|---|---|---|
| 7,837,499 B1* | 11/2010 | Chen | ...................... | H01R 25/00 |
| | | | | 439/541.5 |
| 7,963,799 B1* | 6/2011 | Lee | ...................... | H01R 13/518 |
| | | | | 439/701 |
| 8,187,029 B2* | 5/2012 | Yu | ...................... | H01R 13/659 |
| | | | | 439/541.5 |
| 8,636,534 B2* | 1/2014 | Zhu | ................... | H01R 13/6275 |
| | | | | 439/328 |
| 8,740,643 B2* | 6/2014 | Kuang | ................. | H01R 12/721 |
| | | | | 439/541.5 |
| 9,484,673 B1* | 11/2016 | Yang | ................. | H01R 13/6587 |
| 10,056,710 B1* | 8/2018 | Yang | ................. | H01R 13/518 |
| 10,236,645 B1* | 3/2019 | Yang | ................. | H01R 13/5045 |
| 10,320,124 B1* | 6/2019 | Yang | ................. | H01R 13/6474 |
| 10,553,971 B1* | 2/2020 | Phillips | .............. | H01R 13/6658 |
| 10,651,589 B1* | 5/2020 | Wang | ................. | H01R 12/7052 |
| 10,855,020 B1* | 12/2020 | Phillips | ............... | H01R 12/721 |
| 11,309,648 B1* | 4/2022 | Huang | ................. | H01R 12/725 |
| 11,349,237 B2* | 5/2022 | Blackburn | ............. | H01R 12/57 |
| 2004/0198082 A1* | 10/2004 | Zaderej | ............ | H01R 43/0263 |
| | | | | 439/83 |
| 2008/0072422 A1* | 3/2008 | Levante | ................ | H05K 3/326 |
| | | | | 29/829 |
| 2009/0068882 A1* | 3/2009 | Ting | .................... | H01R 12/725 |
| | | | | 439/541.5 |
| 2012/0009827 A1* | 1/2012 | Hasegawa | .......... | H01R 43/0256 |
| | | | | 439/660 |
| 2021/0203094 A1* | 7/2021 | Li | ......................... | H01R 12/50 |
| 2021/0328369 A1* | 10/2021 | Wu | ................... | H01R 13/6477 |

* cited by examiner

ELECTRICAL CONNECTOR MANUFACTURING METHOD

BACKGROUND OF THE INVENTION

1. Field of the Invention

The present invention relates to an electrical connector, and more particularly to an electrical connector with a plurality of rows of terminals.

2. Description of the Prior Art

The electrical connectors have been widely used in the environmental requirements of power or signal connections. In order to increase the signal transmission efficiency of a single connector, the connector is also developing in the direction of multiple contacts or increasing the signal transmission frequency. As the contact density increases, the manufacturing difficulty of the electrical connector also increases, such as the difficulty in assembling and fixing the terminals. High signal transmission frequency also requires high impedance matching. When the electrical connector does not match in impedance the transmission line, the electrical connector will reflect the signal, causing signal attenuation. The higher the degree of impedance mismatch is, the more serious the signal attenuation is, which will eventually lead to the failure of the signal transmission function of the electrical connector. In a connector with high contact density, the relative position and insulation configuration between the terminals will affect its impedance. The above-mentioned mechanical and electrical requirements for electrical connectors will make the manufacture of electrical connectors difficult.

SUMMARY OF THE INVENTION

An objective of the invention is to provide an electrical connector, which uses a plurality of fixing parts to fix a plurality of rows of terminals so as to provide a high contact density and stable impedance.

An electrical connector according to the invention includes an insulation housing, a row of first terminals, a first fixing part, a row of second terminals, a second fixing part, a row of third terminals, a third fixing part, a row of fourth terminals, and a fourth fixing part. The row of first terminals is fixedly arranged on the insulation housing in a first direction. The first fixing part is assembled to the insulation housing, so that the row of first terminals is structurally constrained between the first fixing part and the insulation housing. The row of second terminals is fixedly arranged on the insulation housing in the first direction relative to the row of first terminals. The first fixing part is located between the row of first terminals and the row of second terminals. The second fixing part is assembled to the insulation housing, so that the row of second terminals is structurally constrained between the second fixing part and the first fixing part. The row of third terminals is fixedly arranged on the insulation housing in the first direction. The second fixing part is located between the row of second terminals and the row of third terminals. The third fixing part is assembled to the insulation housing, so that the row of third terminals is structurally constrained between the third fixing part and the second fixing part. The row of fourth terminals is fixedly arranged on the insulation housing in the first direction relative to the row of third terminals. The third fixing part is located between the row of third terminals and the row of fourth terminals. The fourth fixing part is assembled to the insulation housing, so that the row of fourth terminals is structurally constrained between the fourth fixing part and the third fixing part. Therein, the row of first terminals, the row of second terminals, and the insulation housing form a first plug-in connection port. The row of third terminals, the row of fourth terminals, and the insulation housing form a second plug-in connection port. The first plug-in connection port and the second plug-in connection port are arranged in a second direction. The first direction is perpendicular to the second direction. The first plug-in connection port and the second plug-in connection port jointly provide data transmission in compliance with the peripheral component interconnect express (PCIe) 4.0 standard.

Another objective of the invention is to provide an electrical connector manufacturing method, which can manufactures a connector with a plurality of rows of terminals, which uses a plurality of fixing parts to fix the rows of terminals and provides a high contact density and stable impedance.

An electrical connector manufacturing method according to the invention includes the following steps of: providing an insulation housing; providing a plurality of first terminals; fixing the plurality of first terminals in a row on the insulation housing in a first direction; providing a first fixing part; assembling the first fixing part to the insulation housing, so that the row of first terminals are structurally constrained between the first fixing part and the insulation housing; providing a plurality of second terminals; fixing the plurality of second terminals in a row on the insulation housing in the first direction relative to the row of first terminals; providing a second fixing part; assembling the second fixing part to the insulation housing, so that the row of second terminals are structurally constrained between the second fixing part and the first fixing part; providing a plurality of third terminals; fixing the plurality of third terminals in a row on the insulation housing in the first direction; providing a third fixing part; assembling the third fixing part to the insulation housing, so that the row of third terminals are structurally constrained between the third fixing part and the second fixing part; providing a plurality of fourth terminals; fixing the plurality of fourth terminals in a row on the insulation housing in the first direction relative to the row of third terminals; providing a fourth fixing part; and assembling the fourth fixing part to the insulation housing, so that the row of fourth terminals are structurally constrained between the fourth fixing part and the third fixing part. Therein, the row of first terminals, the row of second terminals, and the insulation housing form a first plug-in connection port. The row of third terminals, the row of fourth terminals, and the insulation housing form a second plug-in connection port. The first plug-in connection port and the second plug-in connection port are arranged in a second direction. The first direction is perpendicular to the second direction. The first plug-in connection port and the second plug-in connection port jointly provide data transmission in compliance with the PCIe 4.0 standard.

Compared with the prior art, the electrical connector according to the invention uses a plurality of fixing parts to fix a plurality of rows of terminals, so that the terminals can be firmly arranged at a high density. Therefore, the relative position and insulation configuration between the terminals can be accurately designed to provide stable impedance. Besides, the electrical connector manufacturing method according to the invention assembles a plurality of rows of terminals and a plurality of fixing parts on the insulation housing in an orderly staggered manner so as to complete the above-mentioned electrical connector with the plurality of rows of terminals. Therefore, the electrical connector manufacturing method can effectively and stably fix the plurality of rows of terminals to the insulation housing, so that the produced electrical connector has a high contact density and stable impedance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
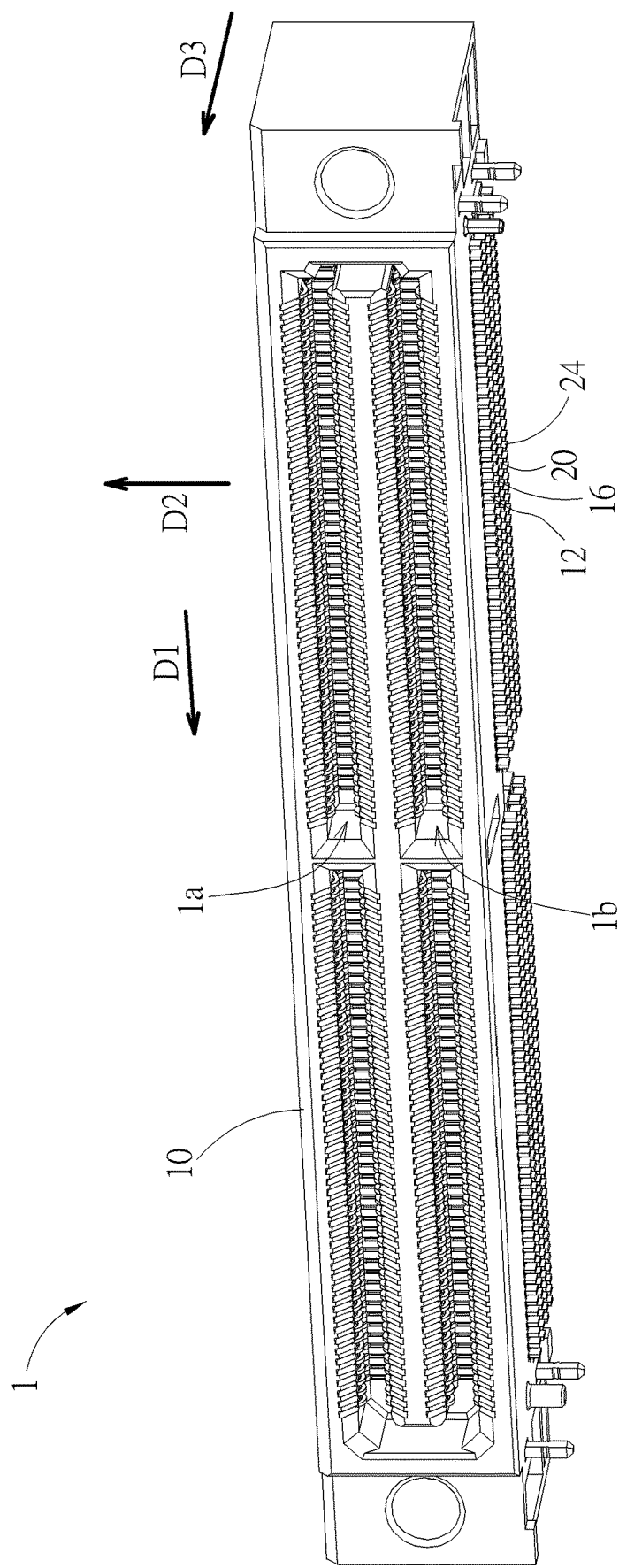
FIG. 1 is a schematic diagram illustrating an electrical connector of an embodiment according to the invention.

Please refer to FIG. 1 to FIG. 4. An electrical connector 1 of an embodiment according to the invention includes an insulation housing 10, a row of first terminals 12, a first fixing part 14, a row of second terminals 16, a second fixing part 18, a row of third terminals 20, a third fixing part 22, a row of fourth terminals 24, and a fourth fixing part 26. The row of first terminals 12 is fixedly arranged on the insulation housing 10 in a first direction D1 (indicated by an arrow in the figures). The first fixing part 14 is assembled to the insulation housing 10, so that the row of first terminals 12 is structurally constrained between the first fixing part 14 and the insulation housing 10. The row of second terminals 16 is fixedly arranged on the insulation housing 10 in the first direction D1 relative to the row of first terminals 12. The first fixing part 14 is located between the row of first terminals 12 and the row of second terminals 16. The second fixing part 18 is assembled to the insulation housing 10, so that the row of second terminals 16 is structurally constrained between the second fixing part 18 and the first fixing part 14. The row of third terminals 20 is fixedly arranged on the insulation housing 10 in the first direction D1. The second fixing part 18 is located between the row of second terminals 16 and the row of third terminals 20. The third fixing part 22 is assembled to the insulation housing 10, so that the row of third terminals 20 is structurally constrained between the third fixing part 22 and the second fixing part 18. The row of fourth terminals 24 is fixedly arranged on the insulation housing 10 in the first direction D1 relative to the row of third terminals 20. The third fixing part 22 is located between the row of third terminals 20 and the row of fourth terminals 24. The fourth fixing part 26 is assembled to the insulation housing 10, so that the row of fourth terminals 24 is structurally constrained between the fourth fixing part 26 and the third fixing part 22.

Thereby, through the insulation housing 10, the first fixing part 14, the second fixing part 18, the third fixing part 22, and the fourth fixing part 26, each row of terminals 12, 16, 20 and 24 can be effectively structurally constrained, so that each row of terminals 12, 16, 20 and 24 can be firmly disposed on the insulation housing 10, providing stable impedance. Therein, the row of first terminals 12, the row of second terminals 16, and the insulation housing 10 form a first plug-in connection port 1b. The row of third terminals 20, the row of fourth terminals 24, and the insulation housing 10 form a second plug-in connection port 1a. The first plug-in connection port 1b and the second plug-in connection port 1a are arranged in a second direction D2 (indicated by an arrow in the figures). The first direction D1 is perpendicular to the second direction D2. In practice, the first plug-in connection port 1b and the second plug-in connection port 1a can jointly provide data transmission in compliance with the PCIe 4.0 standard.

Please refer to FIGS. 3 and 5 to 7. In the embodiment, the insulation housing 10 has a row of first fixing holes 102, corresponding to the row of first terminals 12. The row of first fixing holes 102 is arranged in the first direction D1 and extends in a third direction D3 (indicated by an arrow in the figures). A fixed portion 122 of the first terminal 12 is fixed in the corresponding first fixing hole 102. There is a gap between the fixed portion 122 and a side wall of the corresponding first fixing hole 102 in the first direction D1. Controlling the size of the gap helps to design the impedance of the electrical connector 1. Furthermore, in the embodiment, the insulation housing 10 has a row of locating slots 104, corresponding to the row of first terminals 12. The row of locating slots 104 is arranged in the first direction D1 and extends in the second direction D2. The first fixing part 14 also has a row of locating slots 142, corresponding to the row of first terminals 12. The row of locating slots 142 is arranged in first direction D1 and extends the second direction D2. A connecting portion 124 of the first terminal 12 is accommodated in the corresponding locating slot 104 of the insulation housing 10 and the corresponding locating slot 142 of the first fixing part 14. The locating slots 104 and 142 can jointly structurally constrain the connecting portion 124 of the corresponding first terminal 12 in directions parallel to the first direction D1 and the third direction D3. Furthermore, in the embodiment, the first fixing part 14 also has a plurality of first front abutting portions 144, correspondingly disposed at the bottom of the row of locating slots 142. The first fixing part 14 abuts against the connecting portion 124 of the corresponding first terminal 12 through the first front abutting portion 144 in the third direction D3; in other words, the first front abutting portion 144 and the portion of the insulation housing 10 corresponding to the first front abutting portion 144 jointly hold the connecting portion 124 of the corresponding first terminal 12 in the third direction D3. In practice, the locating slot 142 of the first fixing part 14 can be omitted. The plurality of first front abutting portions 144 can be achieved by a single structural rib, which can abut against the connecting portions 124 of the row of first terminals 12 simultaneously. In this case, the depth of the locating slots 104 of the insulation housing 10 (in the third direction D3) can be designed so that the structural rib can abut against the insulation housing 10 (and the connecting portions 124 of the row of first terminals 12), which also can achieve the structural constraints on the first terminals 12. In addition, in practice, the first fixing hole 102 itself has a positioning effect, so the locating slot 104 of the insulation housing 10 can also be omitted. Furthermore, in the embodiment, the insulation housing 10 has a first engaging structure 106. The first fixing part 14 is detachably connected to the insulation housing 10 through the first engaging structure 106. Therein, the first engaging structure 106 is achieved by holding slots; the first fixing part 14 is achieved by two protruding blocks 146 (located at two opposite sides of the first fixing part 14 in the first direction D1). The protruding blocks 146 are firmly inserted into the holding slots to achieve the detachable connection between the first fixing part 14 and the insulation housing 10, so that the first fixing part 14 can tightly abut against the row of first terminals 12. However, it is not limited thereto in practice. For example, the detachable connection may be achieved by the way of holding by elastic hooks.

Please refer to FIGS. 3 and 5 to 9. In the embodiment, the insulation housing 10 also has a row of second fixing holes 108, corresponding to the row of second terminals 16. The row of second fixing holes 108 is arranged in the first direction D1 and extends in the third direction D3. A fixed portion 162 of the second terminal 16 is fixed in the corresponding second fixing hole 108. There is a gap between the fixed portion 162 and a side wall of the corresponding second fixing hole 108 in the first direction D1. Controlling the size of the gap helps to design the impedance of the electrical connector 1. Furthermore, in the embodiment, the first fixing part 14 has a row of locating slots 148, corresponding to the row of second terminals 16. The row of locating slot 148 is arranged in the first direction D1 and extends in the second direction D2. A connecting portion 164 of the second terminal 16 is accommodated in the corresponding locating slot 148, so that the locating slot 148 has the effect of structurally constraining the corresponding second terminal 16. Furthermore, in the embodiment, the first fixing part 14 also has a plurality of first rear abutting portions 150, correspondingly disposed at the bottom of the row of locating slots 148. The second fixing part 18 has a second front abutting portion 182, achieved by a single structural rib. The second fixing part 18 abuts against the row of second terminals 16 through the second front abutting portion 182 in the third direction D3, and the second terminals 16 abut against the first rear abutting portions 150 in the third direction D3, so that the second front abutting portion 182 and the first rear abutting portions 150 jointly hold the connecting portions 164 of the second terminals 16 in the third direction D3. In practice, the second front abutting portion 182 may also abut against the first fixing part 14, which depends on the depth of the locating slot 148 and the corresponding dimensions of the second terminal 16. In addition, in practice, the locating slots 148 can be omitted. The plurality of the first rear abutting portions 150 can be achieved by a single structural rib. Furthermore, in the embodiment, the insulation housing 10 has a second engaging structure 110. The second fixing part 18 is detachably connected to the insulation housing 10 through the second engaging structure 110. Therein, the second engaging structure 110 is achieved by holding slots; the second fixing part 18 is achieved by two protruding blocks 184 (located at two opposite sides of the second fixing part 18 in the first direction D1). The protruding blocks 184 are firmly inserted into the holding slots to achieve the detachable connection between the second fixing part 18 and the insulation housing 10, so that the second fixing part 18 can tightly abut against the row of second terminals 18. If applicable, the above descriptions about fixing and restraining the first terminals 12 also can be applied herein, which will not be repeated in addition. Furthermore, contact portions 126 of the row of first terminals 12 and contact portions 166 of the row of second terminals 16 are exposed from the front side of the insulation housing 10 and jointly form the first plug-in connection port 1*b* together with the insulation housing 10.

Please refer to FIGS. 3, 5 and 8 to 11. In the embodiment, the insulation housing 10 also has a row of third fixing holes 112, corresponding to the row of third terminals 20. The row of the third fixing holes 112 is arranged in the first direction D1 and extends in the third direction D3. A fixed portion 202 of the third terminal 20 is fixed in the corresponding third fixing hole 112. There is a gap between the fixed portion 202 and a side wall of the corresponding third fixing hole 112 in the first direction D1. Controlling the size of the gap helps to design the impedance of the electrical connector 1. Furthermore, in the embodiment, the second fixing part 18 has a row of locating slots 186, corresponding to the row of third terminals 20. The row of the locating slots 186 is arranged in the first direction D1 and extends in the second direction D2. A connecting portion 204 of the third terminal 20 is accommodated in the corresponding locating slot 186, so that the locating slot 186 has the effect of structurally constraining the corresponding third terminal 20. Furthermore, in the embodiment, the second fixing part 18 also has a plurality of second rear abutting portions 188, correspondingly disposed at the bottom of the row of locating slots 186. The third fixing part 22 has a third front abutting portion 222, achieved by a single structural rib. The third fixing part 22 abuts against the row of third terminals 20 through the third front abutting portion 222 in the third direction D3, and the third terminals 20 abut against the second rear abutting portions 188 in the third direction D3, so that the third front abutting portion 222 and the second rear abutting portions 188 jointly hold the connecting portions 204 of the third terminals 20 in the third direction D3. In practice, the third front abutting portion 222 may also abut against the second fixing part 18, which depends on the depth of the locating slot 186 and the corresponding dimensions of the third terminal 20. In addition, in practice, the locating slots 186 can be omitted. The plurality of the second rear abutting portions 188 can be achieved by a single structural rib. Furthermore, in the embodiment, the insulation housing 10 has a third engaging structure 114. The third fixing part 22 is detachably connected to the insulation housing 10 through the third engaging structure 114. Therein, the third engaging structure 114 is achieved by holding slots; the third fixing part 22 is achieved by two protruding blocks 224 (located at two opposite sides of the third fixing part 22 in the first direction D1). The protruding blocks 224 are firmly inserted into the holding slots to achieve the detachable connection between the third fixing part 22 and the insulation housing 10, so that the third fixing part 22 can tightly abut against the row of third terminals 20. If applicable, the above descriptions about fixing and restraining the first terminals 12 also can be applied herein, which will not be repeated in addition.

Please refer to FIGS. 3, 5 and 10 to 12. In the embodiment, the insulation housing 10 also has a row of fourth fixing holes 116, corresponding to the row of fourth terminals 24. The row of fourth fixing holes 116 is arranged in the first direction D1 and extends in the third direction D3. A fixed portion 242 of the fourth terminal 24 is fixed in the corresponding fourth fixing hole 116. There is a gap between the fixed portion 242 and a side wall of the corresponding second fixing hole 116 in the first direction D1. Controlling the size of the gap helps to design the impedance of the electrical connector 1. Furthermore, in the embodiment, the third fixing part 22 has a row of locating slots 226, corresponding to the row of fourth terminals 24. The row of locating slot 226 is arranged in the first direction D1 and extends in the second direction D2. A connecting portion 244 of the fourth terminal 24 is accommodated in the corresponding locating slot 226, so that the locating slot 226 has the effect of structurally constraining the corresponding fourth terminal 24. Furthermore, in the embodiment, the third fixing part 22 also has a plurality of third rear abutting portions 228, correspondingly disposed at the bottom of the row of locating slots 226. The fourth fixing part 26 has a fourth front abutting portion 262, achieved by a plurality of protrusions that are formed on a single structural rib corresponding to the row of locating slots 226. The fourth fixing part 26 abuts against the row of fourth terminals 24 through the fourth front abutting portion 262 in the third direction D3, and the fourth terminals 24 abut against the third rear abutting portions 228 in the third direction D3, so that the fourth front abutting portion 262 and the third rear abutting portions 228 jointly hold the connecting portions 244 of the fourth terminals 24 in the third direction D3. In practice, the fourth front abutting portion 262 may also abut against the third fixing part 22, which depends on the depth of the locating slot 226, the corresponding dimensions of the fourth terminal 24, and the dimensions of the fourth front abutting portion 262 (for example, in coordination with a modification of the fourth front abutting portion 262 into a single structural rib). In addition, in practice, the locating slots 226 can be omitted. The plurality of the third rear abutting portions 228 can be achieved by a single structural rib. Furthermore, in the embodiment, the insulation housing 10 has a fourth engaging structure 118. The fourth fixing part 26 is detachably connected to the insulation housing 10 through the fourth engaging structure 118. Therein, the fourth engaging structure 118 is achieved by holding slots; the fourth fixing part 26 is achieved by a plurality of protruding blocks 264. The protruding blocks 264 are firmly inserted into the holding slots to achieve the detachable connection between the fourth fixing part 26 and the insulation housing 10, so that the fourth fixing part 26 can tightly abut against the row of fourth terminals 24. If applicable, the above descriptions about fixing and restraining the first terminals 12 also can be applied herein, which will not be repeated in addition. Furthermore, contact portions 206 of the row of third terminals 20 and contact portions 246 of the row of fourth terminals 24 are exposed from the front side of the insulation housing 10 and jointly form the second plug-in connection port 1a together with the insulation housing 10.

Figure 3:
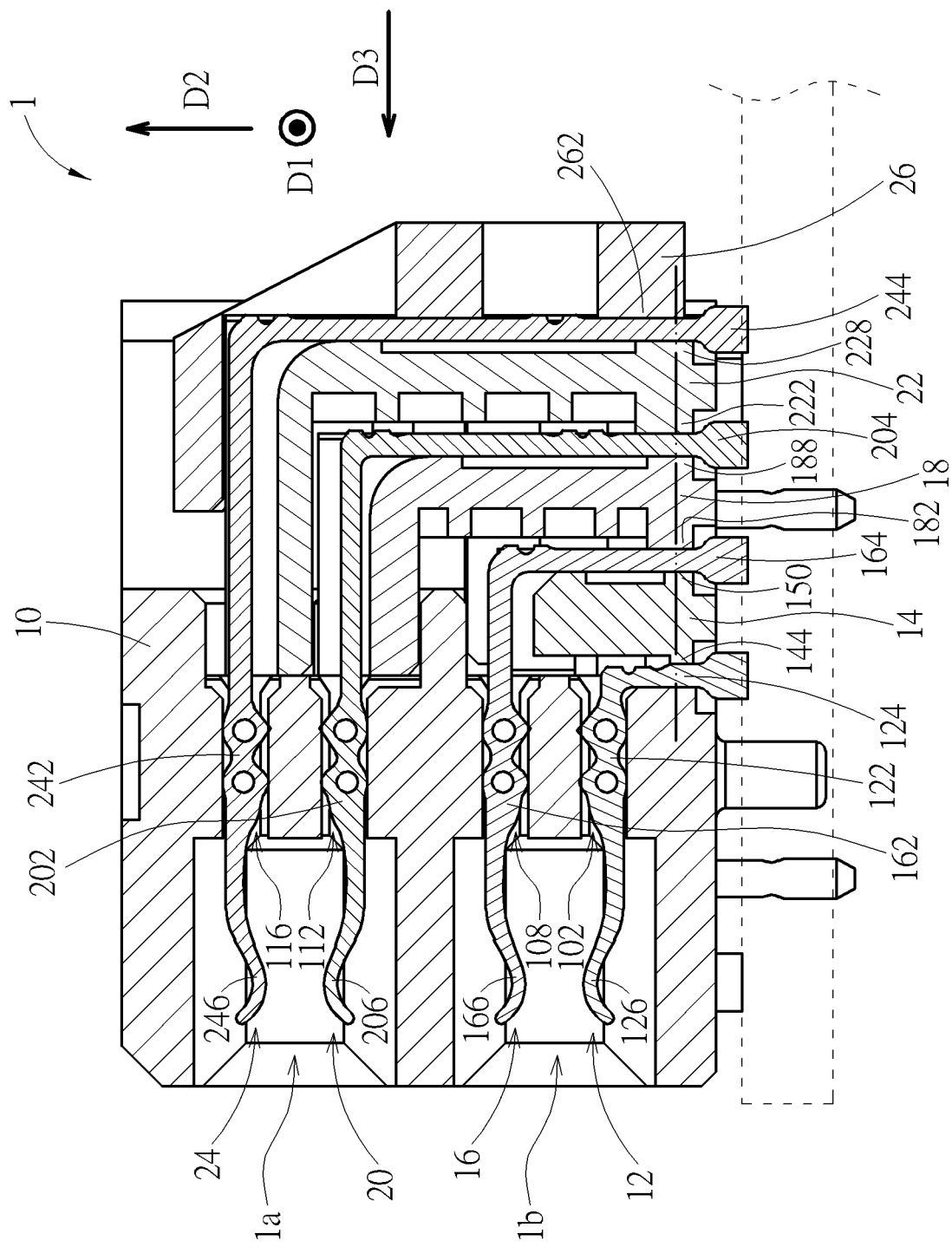
FIG. 3 is a sectional view of the electrical connector along the line X-X in FIG. 2.

Furthermore, in the embodiment, as shown by FIG. 3, the first front abutting portions 144, the first rear abutting portions 150, the second front abutting portion 182, the second rear abutting portions 188, the third front abutting portion 222, the third rear abutting portions 228, and the fourth front abutting portion 262 are roughly located on the same level (indicated by a horizontal chain line in the figure), so that the force of fixing parts 14, 18, 22 and 26 to abut against the terminals 12, 16, 20 and 24 can be directly transmitted to the insulation housing 10, which improves the stability of the fixing of the terminals 12, 16, 20 and 24. In addition, each of the abutting portions 144, 150, 182, 188, 222, 248 and 262 is close to a corresponding distal end of each of the terminals 12, 16, 20 and 24 (for example, used as a solder portion for being connected onto a circuit board (indicated by a dashed frame in FIG. 3), which helps to stably fix the terminals 12, 16, 20, and 24 as a whole, which is convenient for transportation and installation (for example, placed on the circuit board). However, the invention is not limited thereto. Furthermore, in the embodiment, the fixing parts 14, 18, 22 and 26 abut against the connecting portions 124, 164, 204 and 244 of the terminals 12, 16, 20 and 24 respectively, but there is still a gap between each of the fixing parts 14, 18, 22 and 26 and the corresponding one of the connecting portions 124, 164, 204 and 244, which is conducive to the design of the impedance of the electrical connector 1.

In addition, in the embodiment, the terminals 12, 16, 20 and 24 are all L-shaped. Taking the second terminal 16 as an example, the connecting portion 164 extends in the second D2. The fixed portion 162 and the contact portion 166 extend in the third direction D3. The corresponding locating slot 142 also extends along the second direction D2 to match the connecting portion 164. The third direction D3 is perpendicular to the first direction D1 and the second direction D2. However, the invention is not limited thereto in practice. For example, the second direction D2 is not perpendicular to the third direction D3, and the second terminal 16 is correspondingly in an L shape that gradually opens. In addition, in the embodiment, the first to fourth engaging structures 106, 110, 114 and 118 are roughly arranged in the second direction D2, but the invention is not limited thereto.

Figure 13:
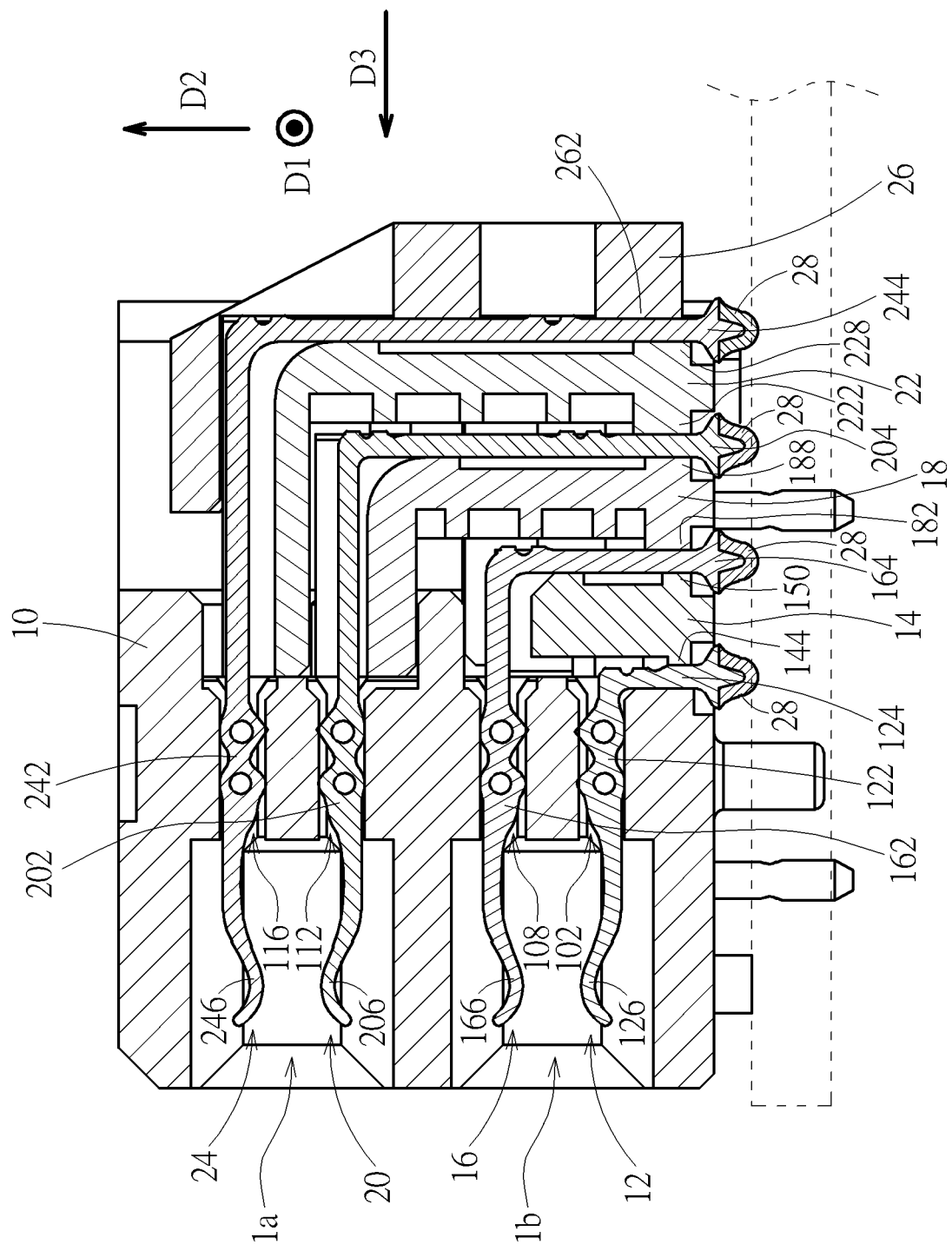
FIG. 13 is a sectional view of an electrical connector with solder balls.
Figure 14:
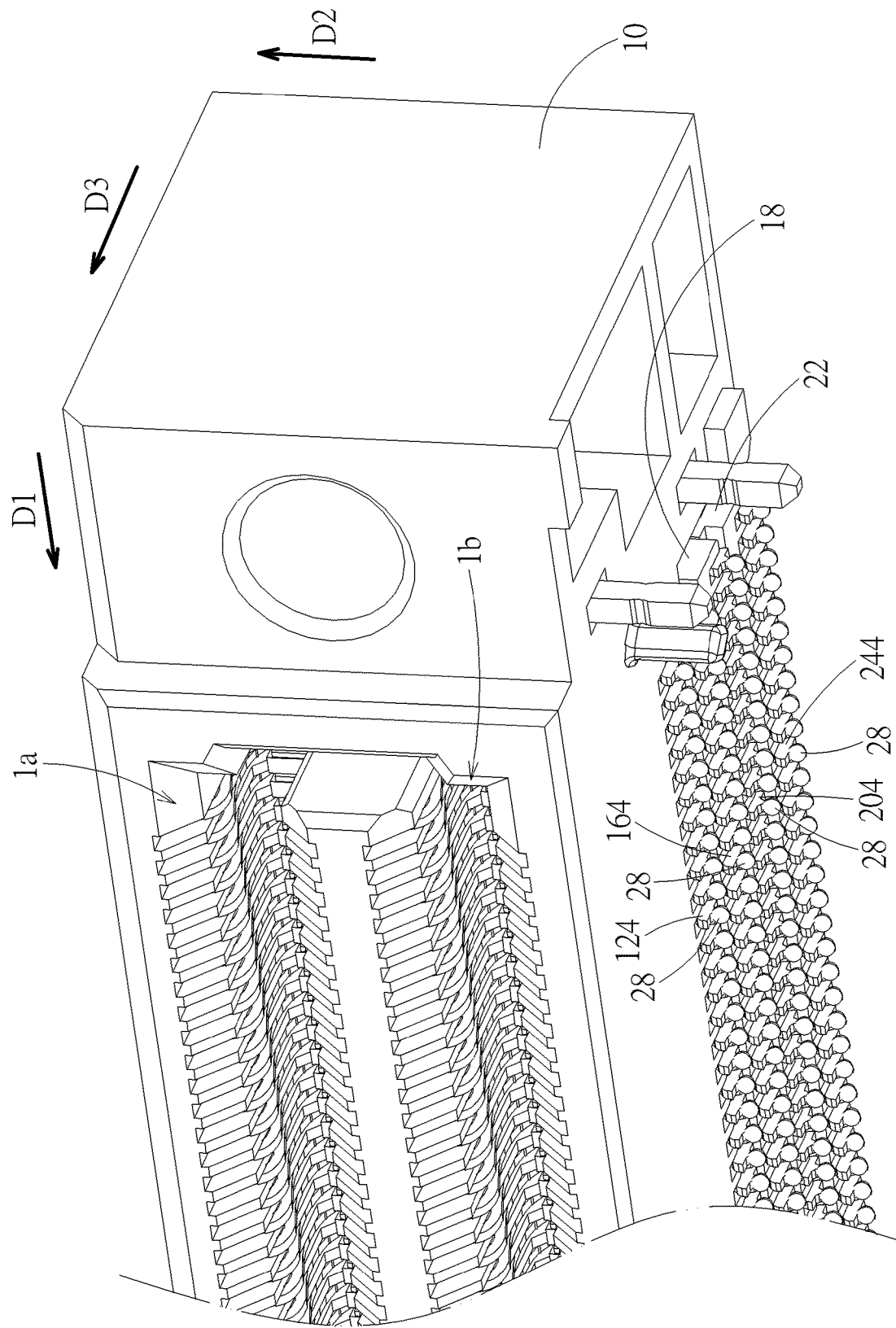
FIG. 14 is a schematic diagram illustrating the electrical connector with solder balls.

In addition, in practice, the distal ends of the connecting portions 124, 164, 204 and 244 may be formed into a required shape in accordance with the installation method by which the electrical connector 1 is electrically connected to the circuit board. When using a plug-in installation, the distal end is rod-shaped. For another example, when using a SMT installation, the distal end provides a surface parallel to the circuit board (or the solder pad thereof). For another example, the distal end is provided with a solder ball 28 thereon and also can be installed by SMT, as shown by FIG. 13 and FIG. 14. Therein, the distal ends of the connecting portions 124, 164, 204 and 244 are pointed and encapsulated by solder balls 28 (shown by a sphere in FIG. 14 for simplification of drawing).

Figure 4:
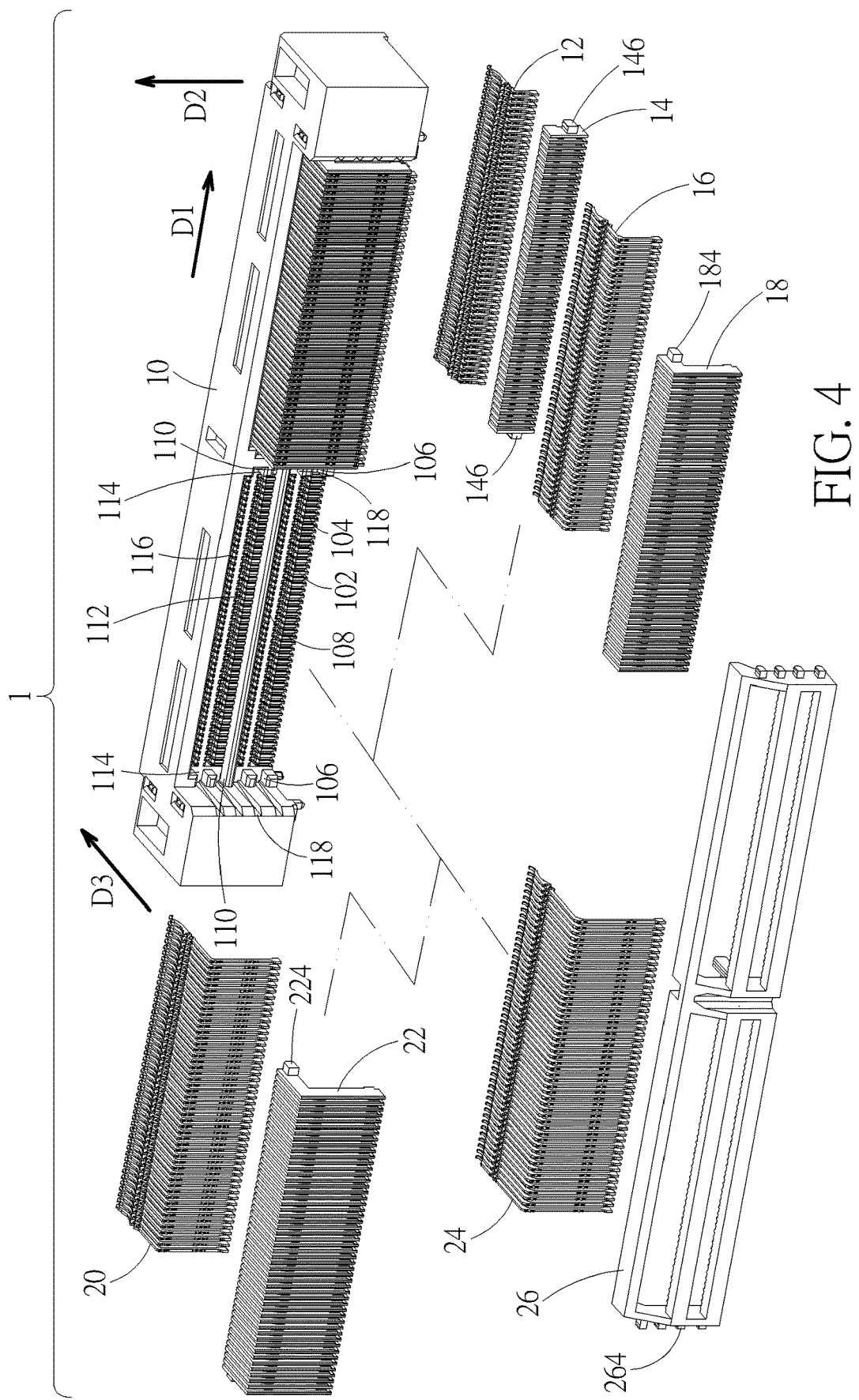
FIG. 4 is a partially exploded view of the electrical connector in FIG. 2.
Figure 5:
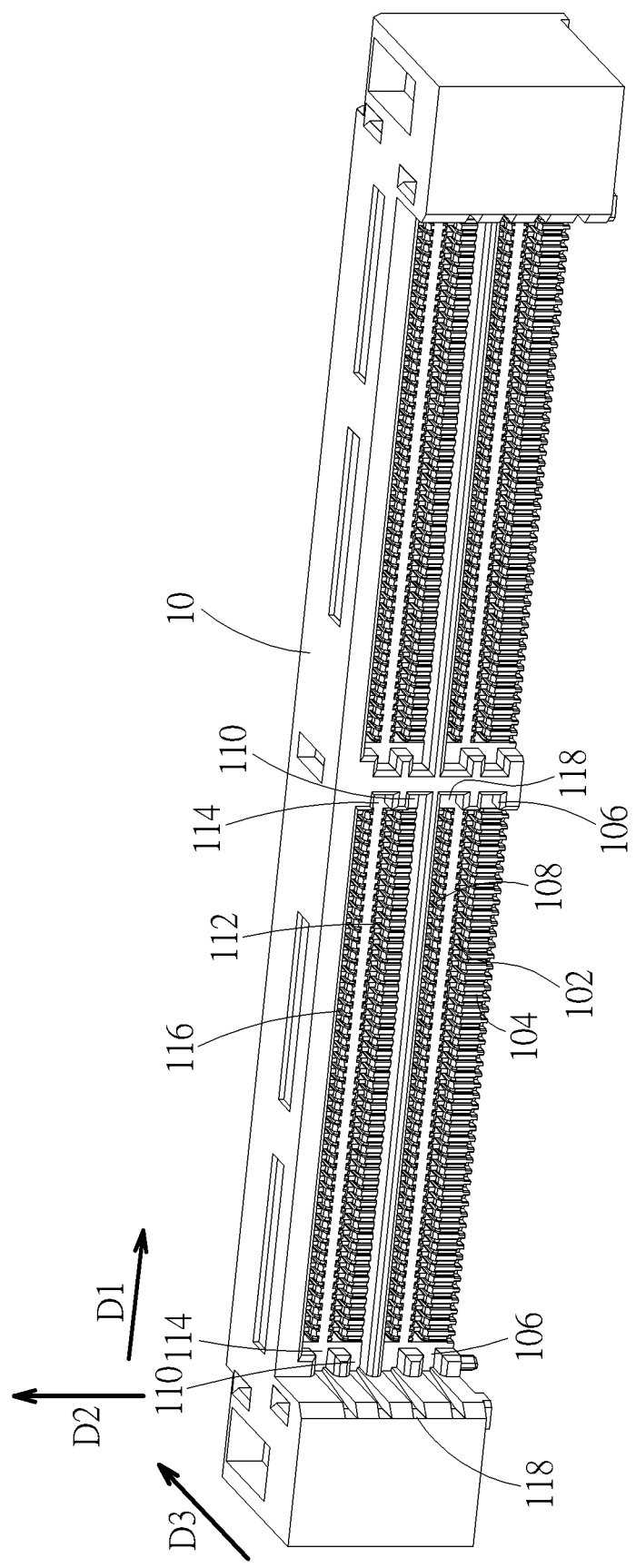
FIG. 5 is a schematic diagram illustrating an insulation housing of the electrical connector in FIG. 4.
Figure 6:
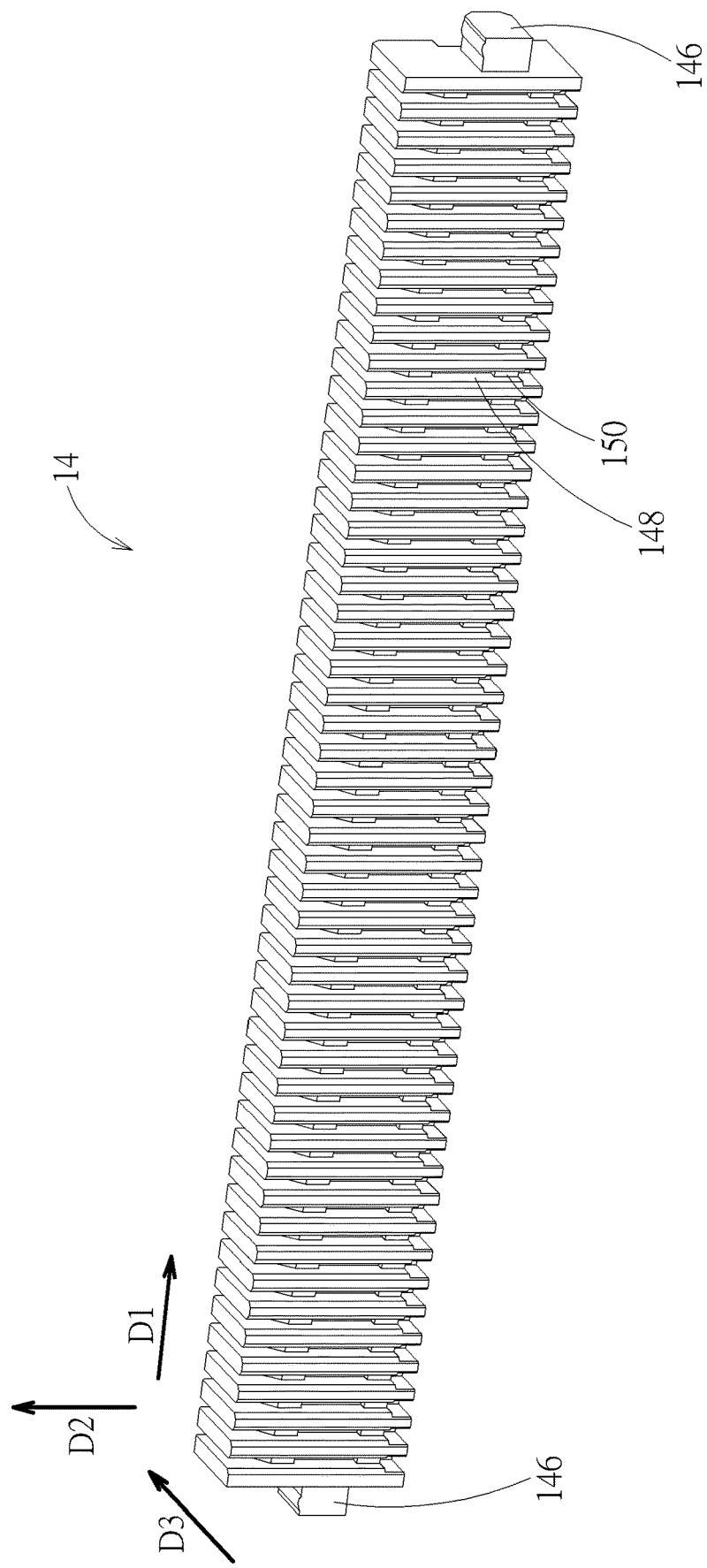
FIG. 6 is a schematic diagram illustrating a first fixing part of the electrical connector in FIG. 4.
Figure 7:
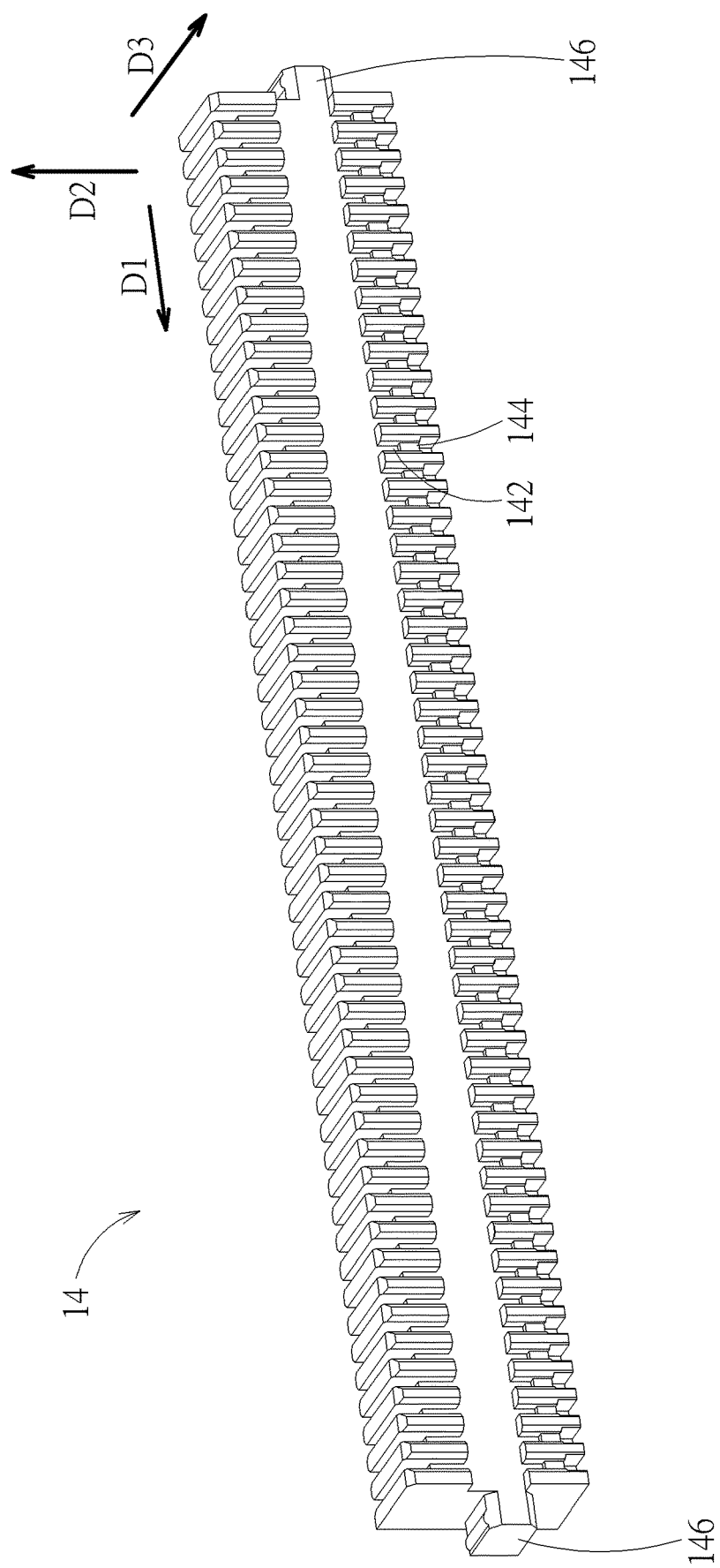
FIG. 7 is a schematic diagram illustrating the first fixing part in FIG. 6 in another view point.
Figure 16:
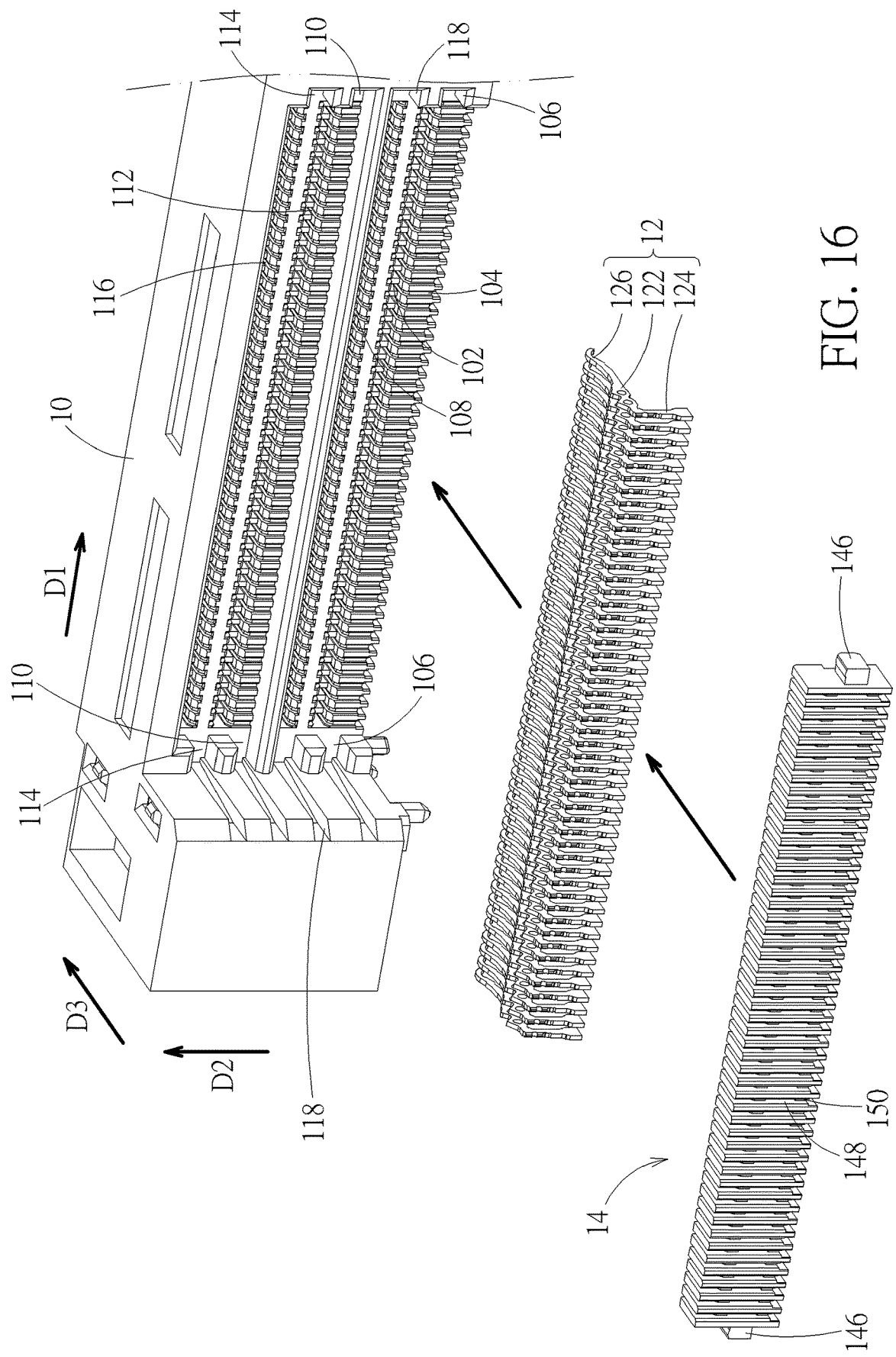
FIG. 16 is a schematic diagram illustrating of the assembly of first terminals and a first fixing part to an insulation housing.
Figure 17:
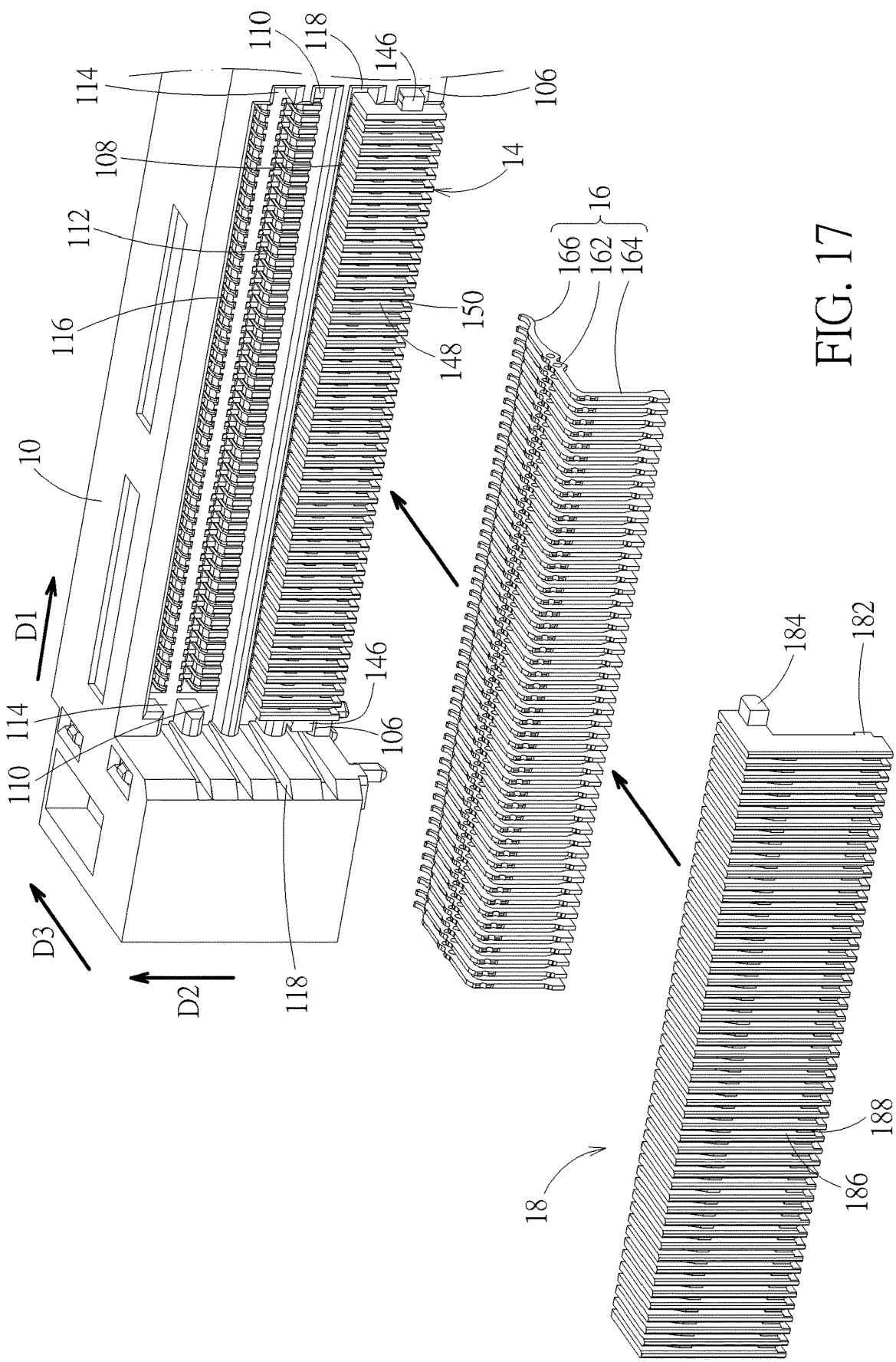
FIG. 17 is a schematic diagram illustrating of the assembly of second terminals and a second fixing part to the insulation housing, after the assembly of the first terminals and the first fixing part.

In practice, the electrical connector 1 can be manufactured by the following method. Please refer to FIG. 15, which is a flow chart of an electrical connector manufacturing method of an embodiment according to the invention. Please also refer to FIG. 16. According to the electrical connector manufacturing method, as shown by the step S102, the insulation housing 10 (as shown by FIG. 5) and the plurality of first terminals 12 (as shown by FIG. 3 and FIG. 4) are provided; as shown by the step S104, the plurality of first terminals 12 are inserted into the insulation housing 10 (or the first fixing holes 102 thereof) in the third direction D3 so as to be fixed on the insulation housing 10 in a row in the first direction D1; as shown by the step S106, the first fixing part 14 (as shown by FIG. 6 and FIG. 7) is provided and then is assembled to the insulation housing 10 so that the row of first terminals 12 is structurally constrained between the first fixing part 14 and the insulation housing 10, as shown by FIG. 17 (also referring to FIG. 3). Therein, the fixed portion 122 of the first terminal 12 is fixed in the corresponding first fixing hole 102. The connecting portion 124 of the first terminal 12 is located in the corresponding locating slot 104 of the insulation housing 10 and the corresponding locating slot 142 of the first fixing part 14. The first fixing part 14 abuts against the first terminal 12 through the first front abutting portion 144 in the third direction D3. As described in the foregoing about fixing and constraining the first terminals 12 in the electrical connector 1, in practice, the first front abutting portion 144 can also be designed to abut against the insulation housing 10, which will not be repeated in addition. The first front abutting portion 144 and the portion of the insulation housing 10 corresponding to the first front abutting portion 144 jointly hold the connecting portion 124 of the corresponding first terminal 12 in the third direction D3. Furthermore, the first fixing part 14 is detachably connected to the insulation housing 10 through the first engaging structure 106.

Figure 8:
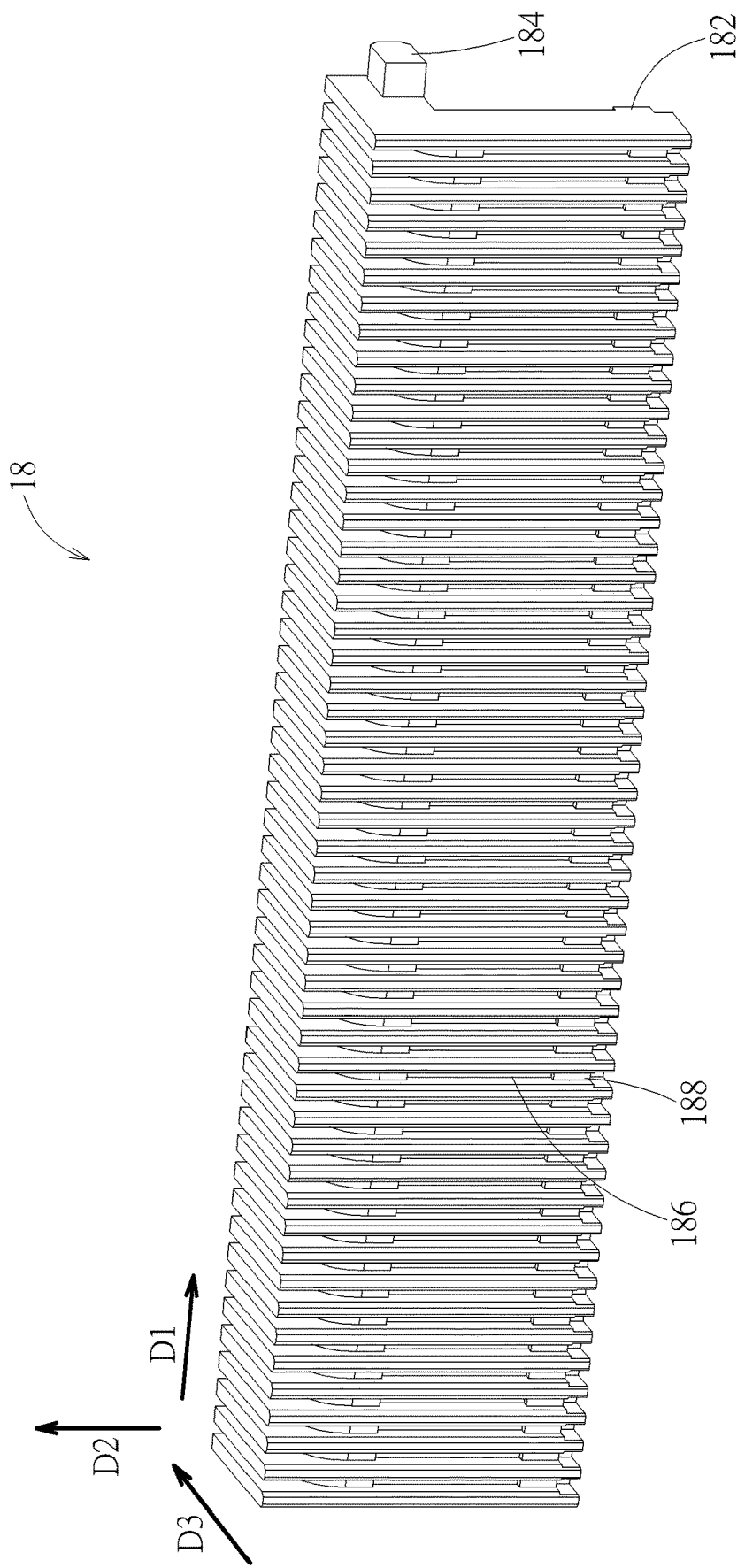
FIG. 8 is a schematic diagram illustrating a second fixing part of the electrical connector in FIG. 4.
Figure 9:
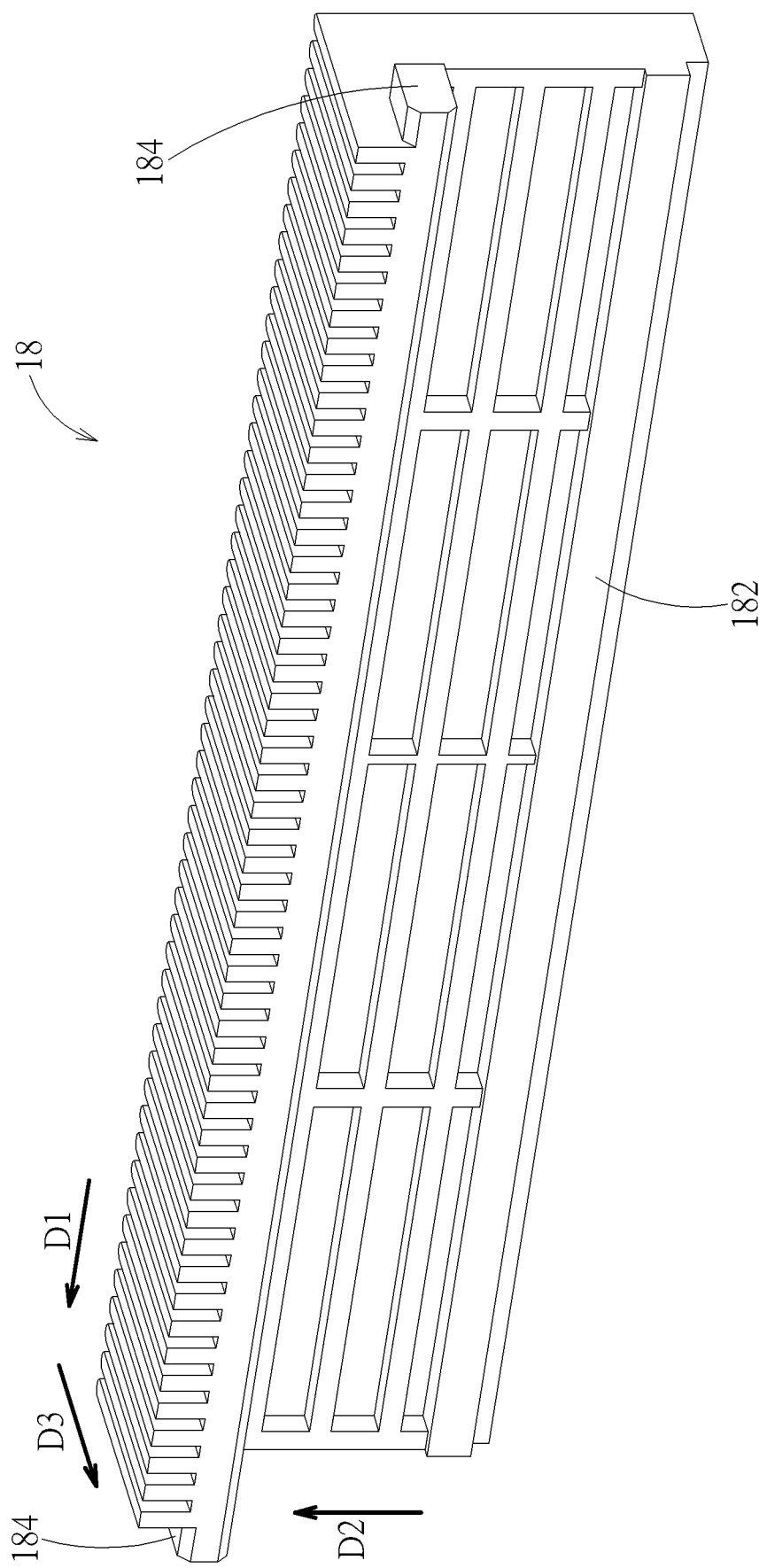
FIG. 9 is a schematic diagram illustrating the second fixing part in FIG. 8 in another view point.
Figure 15:
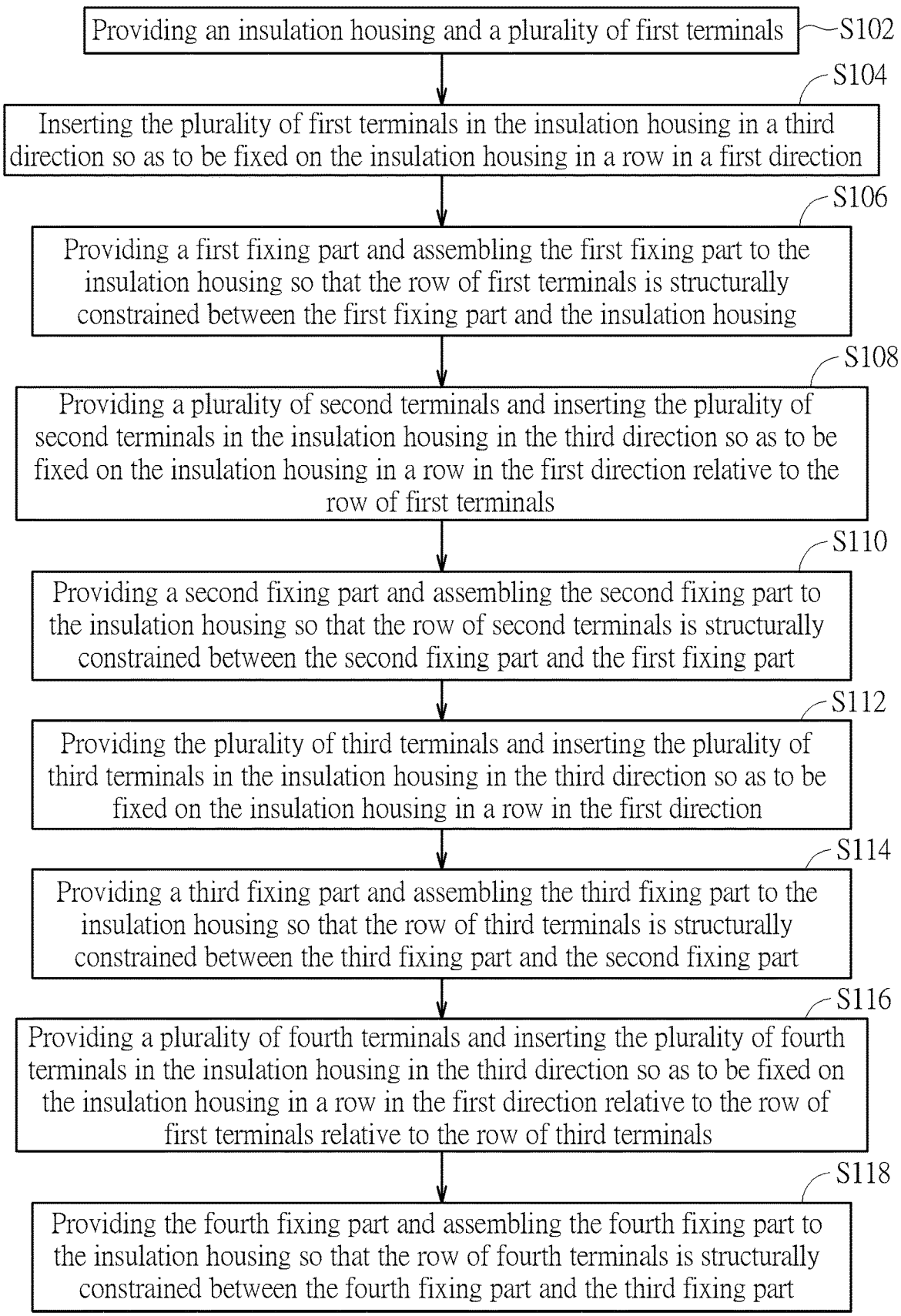
FIG. 15 is a flowchart of an electrical connector manufacturing method of an embodiment according to the invention.
Figure 18:
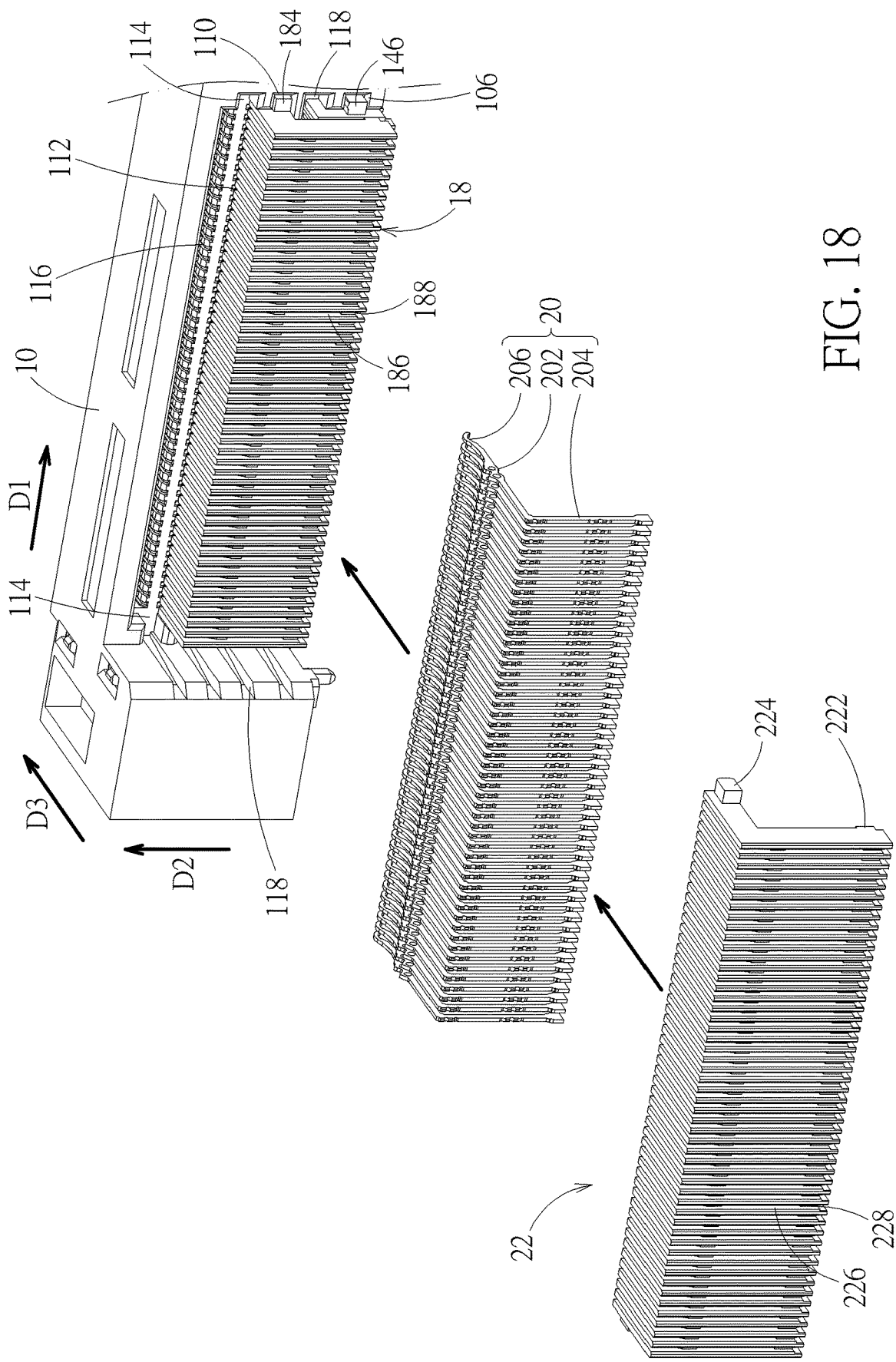
FIG. 18 is a schematic diagram illustrating of the assembly of third terminals and a third fixing part to the insulation housing, after the assembly of the second terminals and the second fixing part.

Please refer to FIG. 15 and FIG. 17. According to the electrical connector manufacturing method, as shown by the step S108, the plurality of second terminals 16 (as shown by FIG. 3 and FIG. 4) are provided and are inserted into the insulation housing 10 (or the second fixing holes 108 thereof) in the third direction D3 so as to be fixed on the insulation housing 10 in a row in the first direction D1 relative to the row of first terminals; as shown by the step S110, the second fixing part 18 (as shown by FIG. 8 and FIG. 9) is provided and then is assembled to the insulation housing 10 so that the row of second terminals 16 is structurally constrained between the second fixing part 18 and the first fixing part 14, as shown by FIG. 18 (also referring to FIG. 3). Therein, the fixed portion 162 of the second terminal 16 is fixed in the corresponding second fixing hole 108. The second terminal 16 is disposed in the corresponding locating slot 148 of the first fixing part 14. The second fixing part 18 abuts against the second terminal 16 through the second front abutting portion 182 in the third direction D3. As described in the foregoing about fixing and constraining the second terminals 16, in practice, the second front abutting portion 182 can also be designed to abut against the first fixing part 14, which will not be repeated. In addition, the second terminal 16 abuts against the first rear abutting portion 150 in the third direction D3. The second front abutting portion 182 and the first rear abutting portion 150 jointly hold the connecting portion 164 of the second terminal 16 in the third direction D3. Furthermore, the second fixing part 18 is detachably connected to the insulation housing 10 through the second engaging structure 110. The contact portions 126 of the row of first terminals 12 and the contact portions 166 of the row of second terminals 16 are exposed from the front side of the insulation housing 10 and jointly form the first plug-in connection port 1b together with the insulation housing 10.

Figure 10:
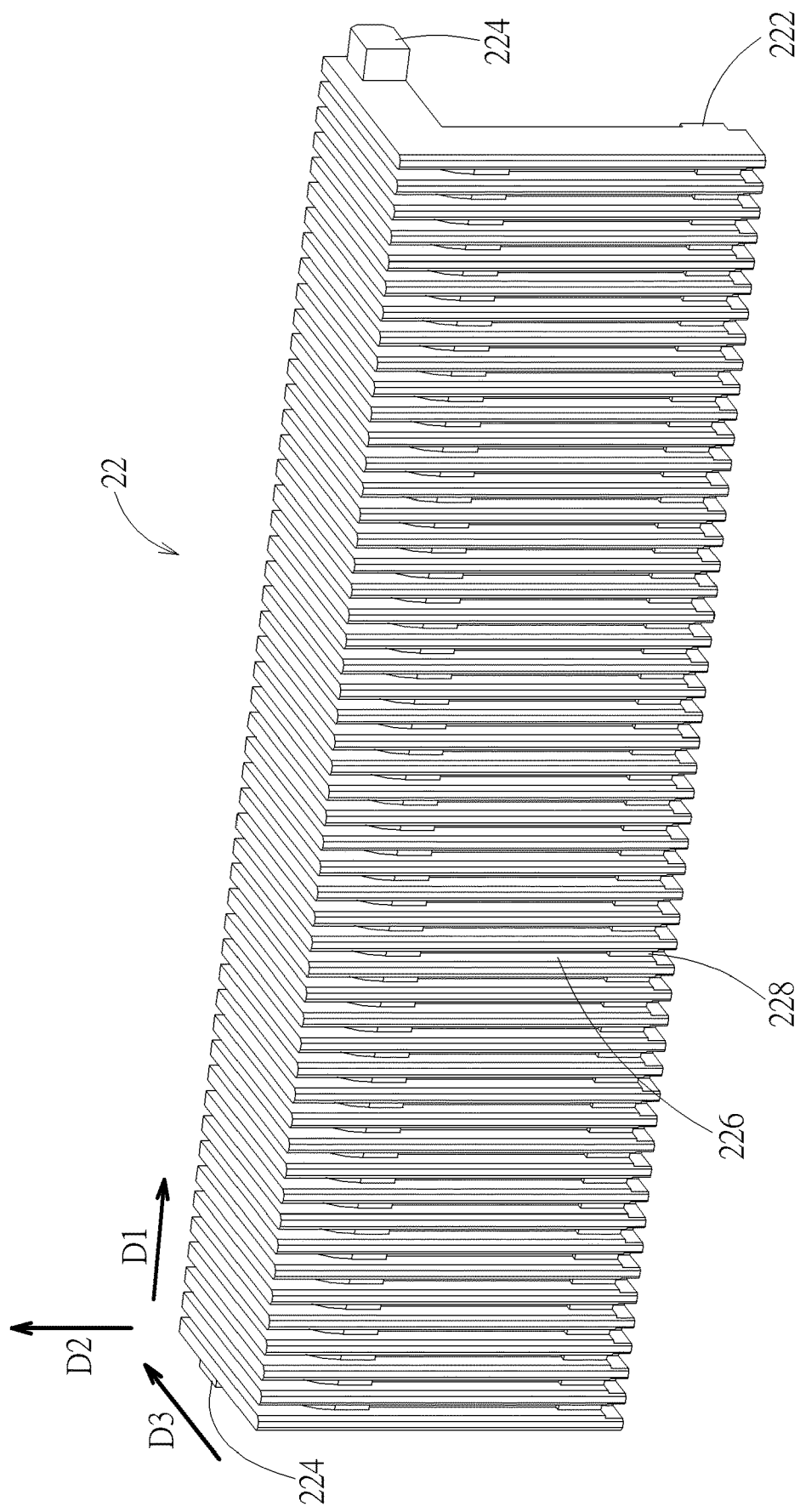
FIG. 10 is a schematic diagram illustrating a third fixing part of the electrical connector in FIG. 4.
Figure 11:
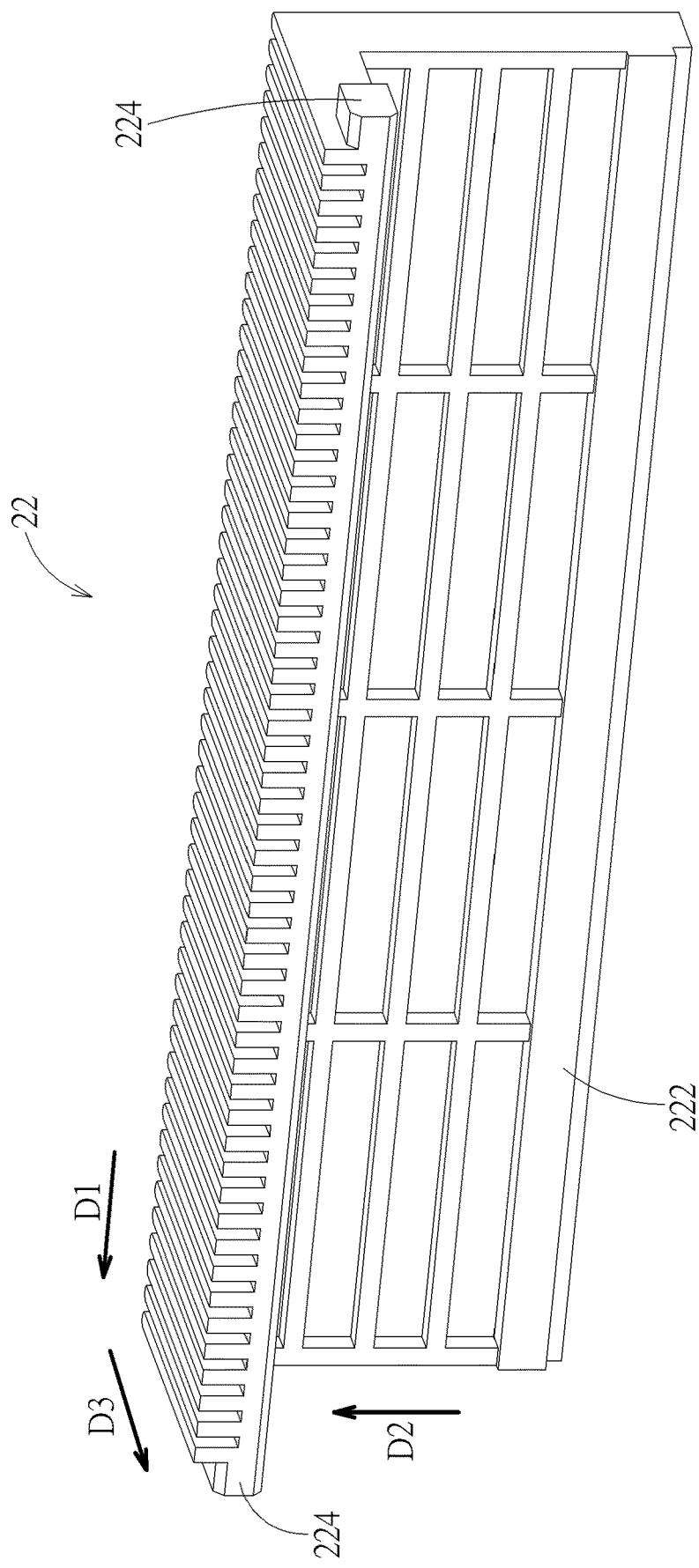
FIG. 11 is a schematic diagram illustrating the third fixing part in FIG. 10 in another view point.
Figure 19:
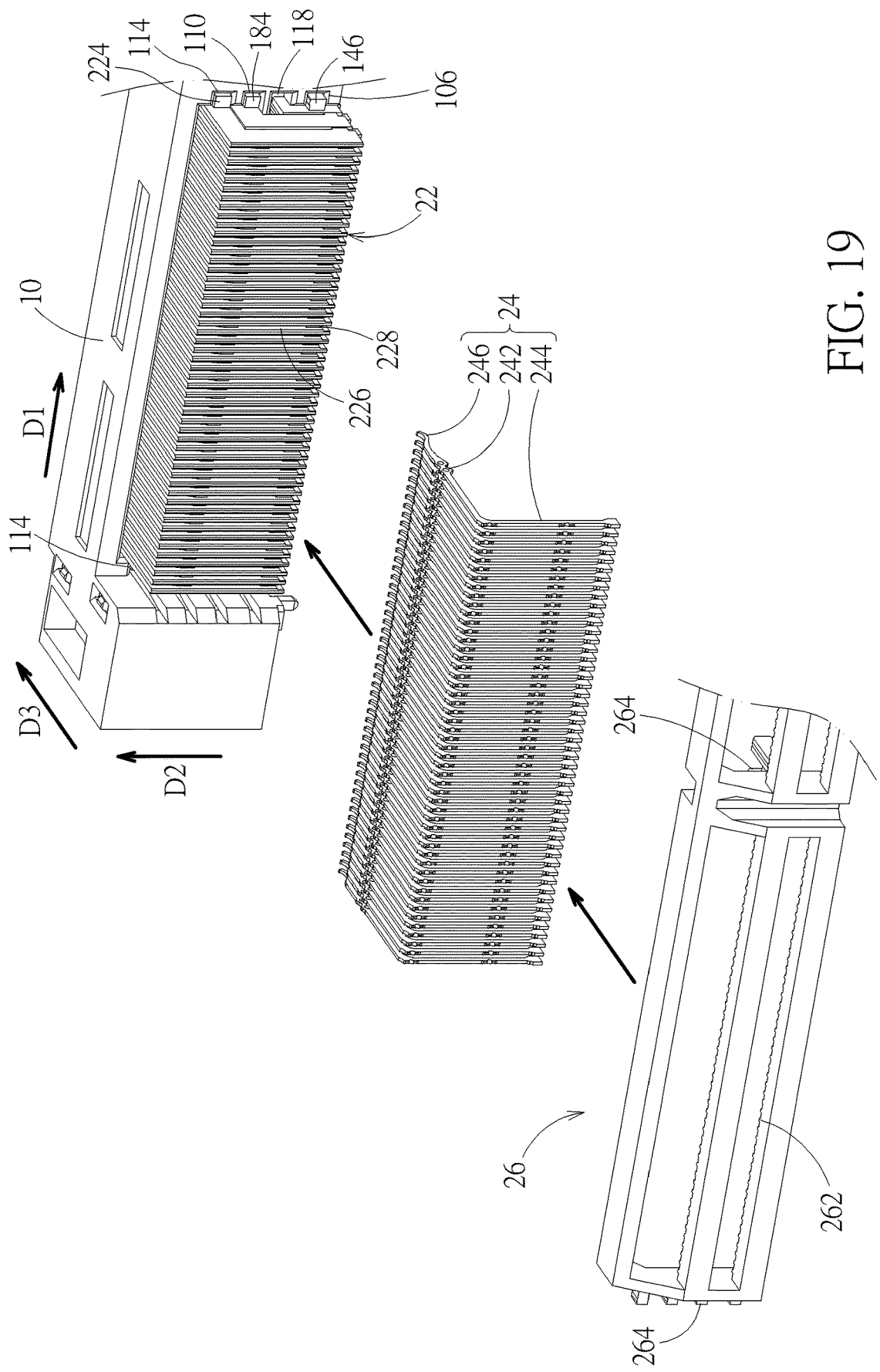
FIG. 19 is a schematic diagram illustrating of the assembly of fourth terminals and a fourth fixing part to the insulation housing, after the assembly of the third terminals and the third fixing part.

Please refer to FIG. 15 and FIG. 18. According to the electrical connector manufacturing method, as shown by the step S112, the plurality of third terminals 20 (as shown by FIG. 3 and FIG. 4) and then are inserted in the insulation housing 10 (or the third fixing holes 112 thereof) in the third direction D3 so as to be fixed on the insulation housing 10 in a row in the first direction D1; as shown by the step S114, the third fixing part 22 (as shown by FIG. 10 and FIG. 11) is provided and then is assembled to the insulation housing 10 so that the row of third terminals 20 is structurally constrained between the third fixing part 22 and the second fixing part 18, as shown by FIG. 19 (also referring to FIG. 3) Therein, the fixed portion 202 of the third terminal 20 is fixed in the corresponding third fixing hole 112. The third terminal 20 is disposed in the corresponding locating slot 186 of the second fixing part 18. The third fixing part 22 abuts against the third terminal 20 through the third front abutting portion 222 in the third direction D3. As described in the foregoing about fixing and constraining the third terminal 20, in practice, the third front abutting portion 222 can also be designed to abut against the second fixing part 18, which will not be repeated. In addition, the third terminal 20 abuts against the second rear abutting portion 188 in the third direction D3. The third front abutting portion 222 and the second rear abutting portion 188 jointly hold the connecting portion 204 of the third terminal 20 in the third direction D3. Furthermore, the third fixing part 22 is detachably connected to the insulation housing 10 through the third engaging structure 114.

Figure 2:
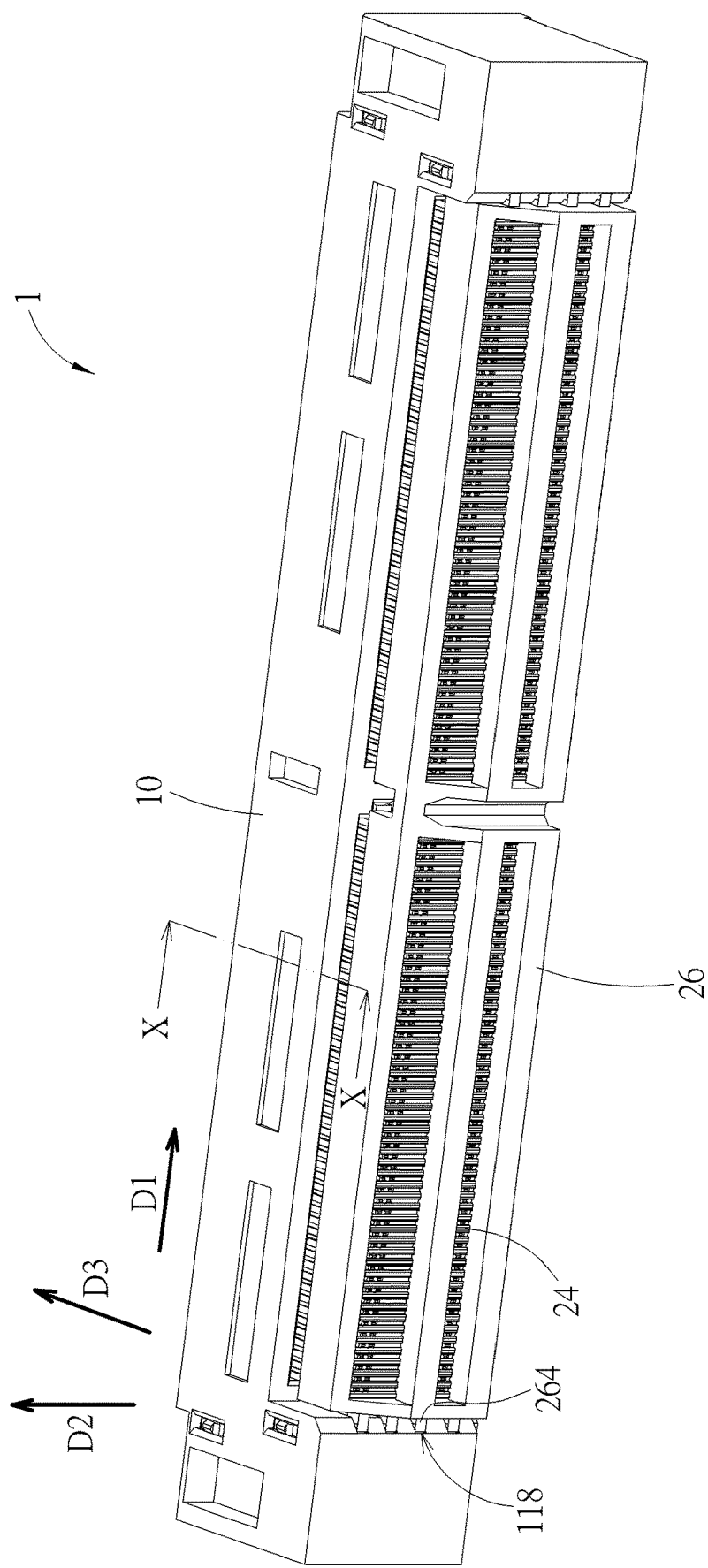
FIG. 2 is a schematic diagram illustrating the electrical connector in FIG. 1 in another view point.
Figure 12:
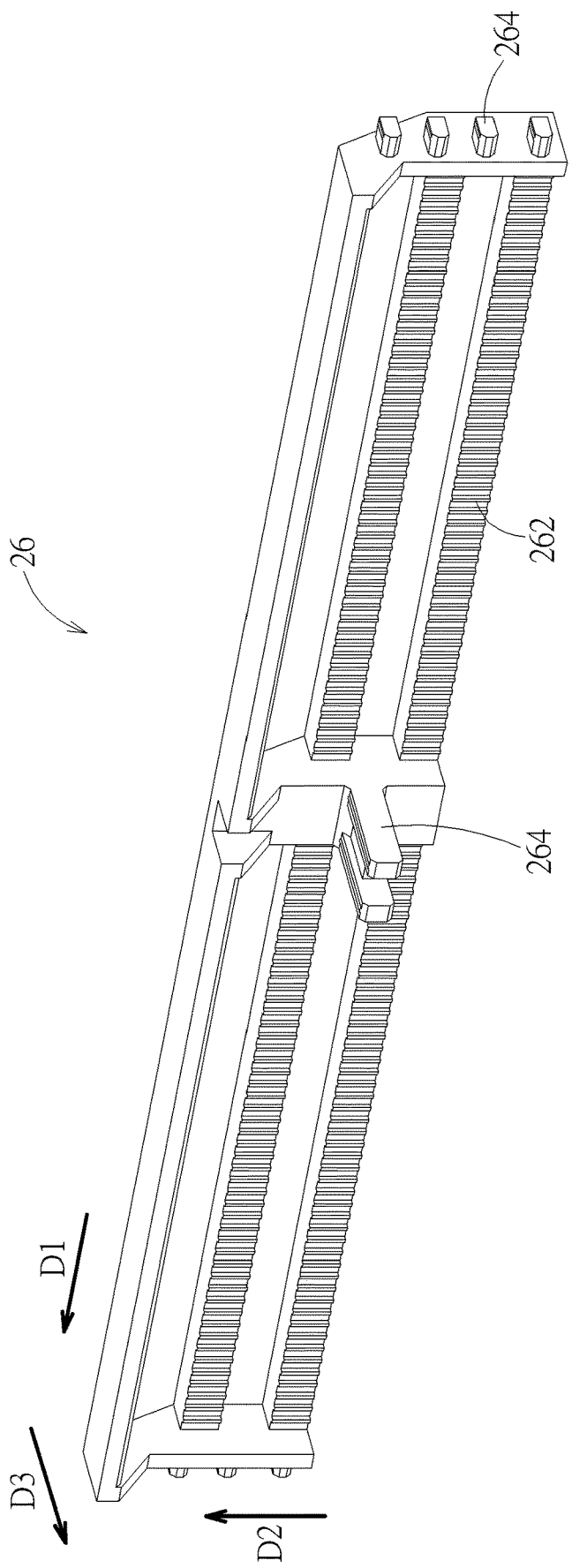
FIG. 12 is a schematic diagram illustrating a fourth fixing part of the electrical connector in FIG. 4 in another view point.

Please refer to FIG. 15 and FIG. 19. According to the electrical connector manufacturing method, as shown by the step S116, the plurality of fourth terminals 24 (as shown by FIG. 3 and FIG. 4) are provided and are inserted into the insulation housing 10 (or the fourth fixing holes 116 thereof) in the third direction D3 so as to be fixed on the insulation housing 10 in a row in the first direction D1 relative to the row of first terminals relative to the row of third terminals 20; as shown by the step S118, the fourth fixing part 26 (as shown by FIG. 12) is provided and then is assembled to the insulation housing 10 so that the row of fourth terminals 24 is structurally constrained between the fourth fixing part 26 and the third fixing part 22, as shown by FIG. 2 (also referring to FIG. 3). Therein, the fixed portion 242 of the fourth terminal 24 is fixed in the corresponding fourth fixing hole 116. The fourth terminal 24 is disposed in the corresponding locating slot 226 of the third fixing part 22. The fourth fixing part 26 abuts against the fourth terminal 24 through the fourth front abutting portion 262 in the third direction D3. As described in the foregoing about fixing and constraining the fourth terminals 24, in practice, the fourth front abutting portion 262 can also be designed to abut against the third fixing part 22, which will not be repeated. In addition, the fourth terminal 24 abuts against the third rear abutting portion 228 in the third direction D3. The fourth front abutting portion 262 and the third rear abutting portion 228 jointly hold the connecting portion 244 of the fourth terminal 24 in the third direction D3. Furthermore, the fourth fixing part 26 is detachably connected to the insulation housing 10 through the fourth engaging structure 118. The contact portions 206 of the row of third terminals 20 and the contact portions 246 of the row of fourth terminals 24 are exposed from the front side of the insulation housing 10 and jointly form the second plug-in connection port 1a together with the insulation housing 10. Thereby, the electrical connector 1 is completed.

Figure 22:
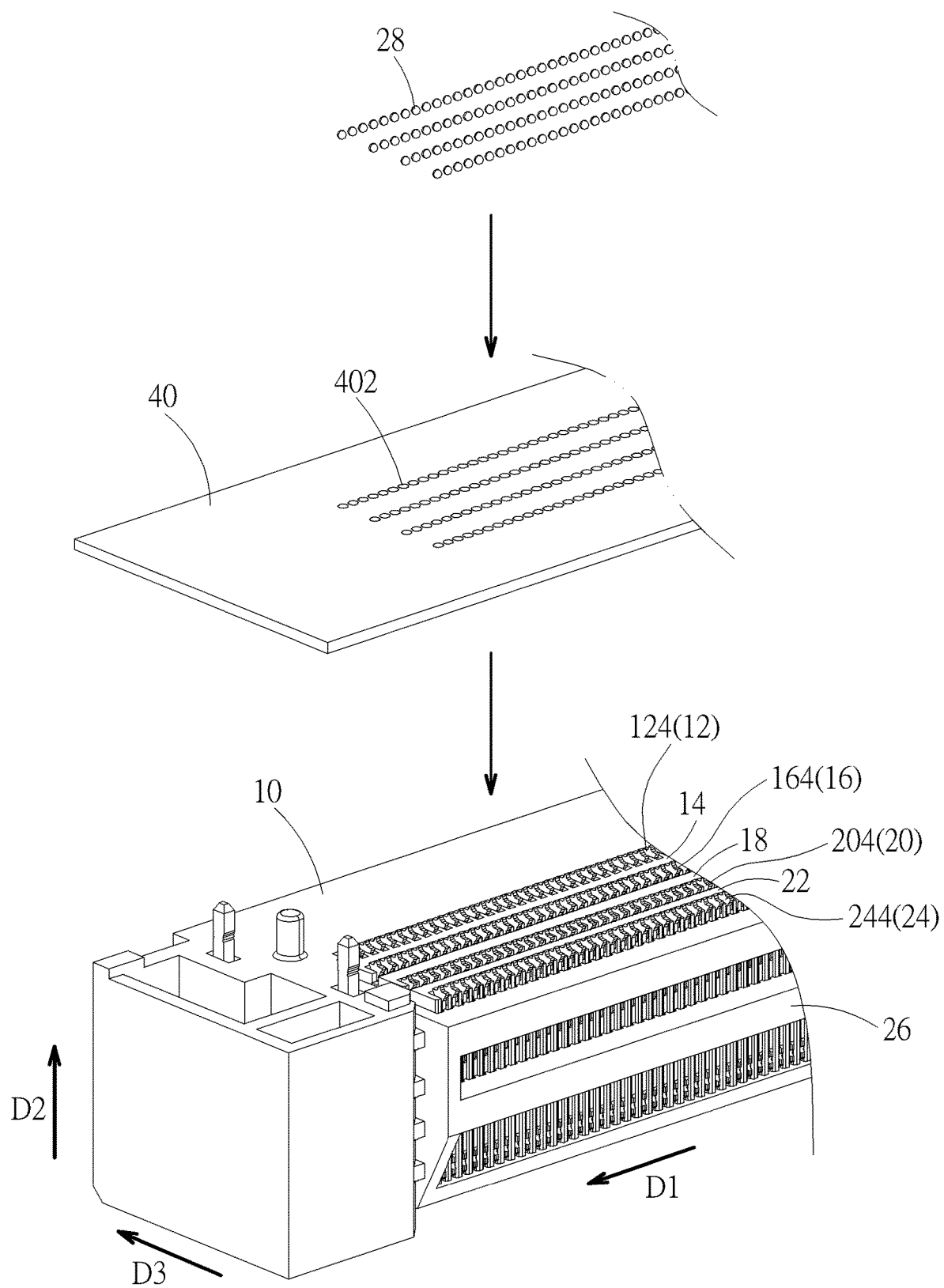
FIG. 22 is a schematic diagram illustrating the placement of solder balls on the electrical connector.

Furthermore, in practice, if an electrical connector (provided with solder balls 28) as shown in FIG. 13 and FIG. 14 is required to be produced, the above electrical connector manufacturing method needs to provide a stencil 40 after the step S118, as shown by FIG. 22. The stencil 40 has four rows of through holes 402. Afterwards, the stencil 40 is placed on the insulation housing 10, so that the row of first terminals 12, the row of second terminals 16, the row of third terminals 20, and the row of fourth terminals 24 aligns with the four rows of through holes 402 respectively; then one solder ball 28 is placed in each through hole 402. Therein, the inner diameter of the through hole 402 is slightly larger than the outer diameter of the solder ball 28, so the solder ball 28 will touch the distal end of the corresponding terminal 12, 16, 20 or 24 after placed into the through hole 402. Afterwards, the plurality of solder balls 28 are heated, so that the plurality of solder balls 28 melt to be soldered to the distal ends of the row of first terminals 12, the row of second terminals 16, the row of third terminals 20 and the row of fourth terminals 24 (referring to FIG. 13). Therein, the solder balls 28 encapsulate the corresponding distal ends of the terminals 12, 16, 20 and 24. In practice, by choosing proper materials of the solder balls 28, the terminals 12, 16, 20 and 24 (or the coating on its outer surface), and the stencil 40, the solder balls 28 can be easily combined with the terminals 12, 16, 20 and 24 and can be prevented from being combined with the stencil 40. This can be achieved by a method similar to chip planting solder balls on a chip, and will not be described in addition. After the molten solder balls 28 have solidified, the method is to remove the stencil 40. Thereby, the electrical connector 1 with the solder balls 28 is completed.

Figure 20:
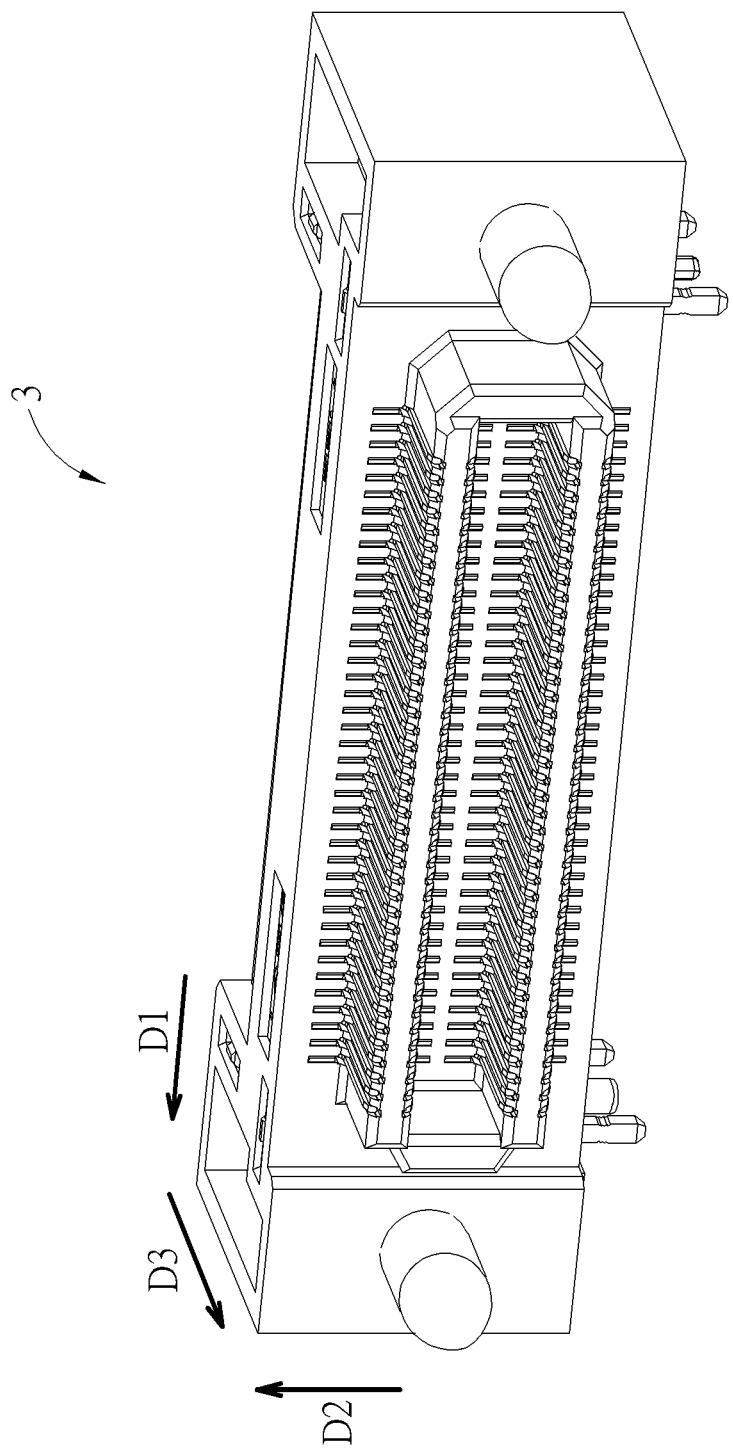
FIG. 20 is a schematic diagram illustrating an electrical connector of another embodiment according to the invention.
Figure 21:
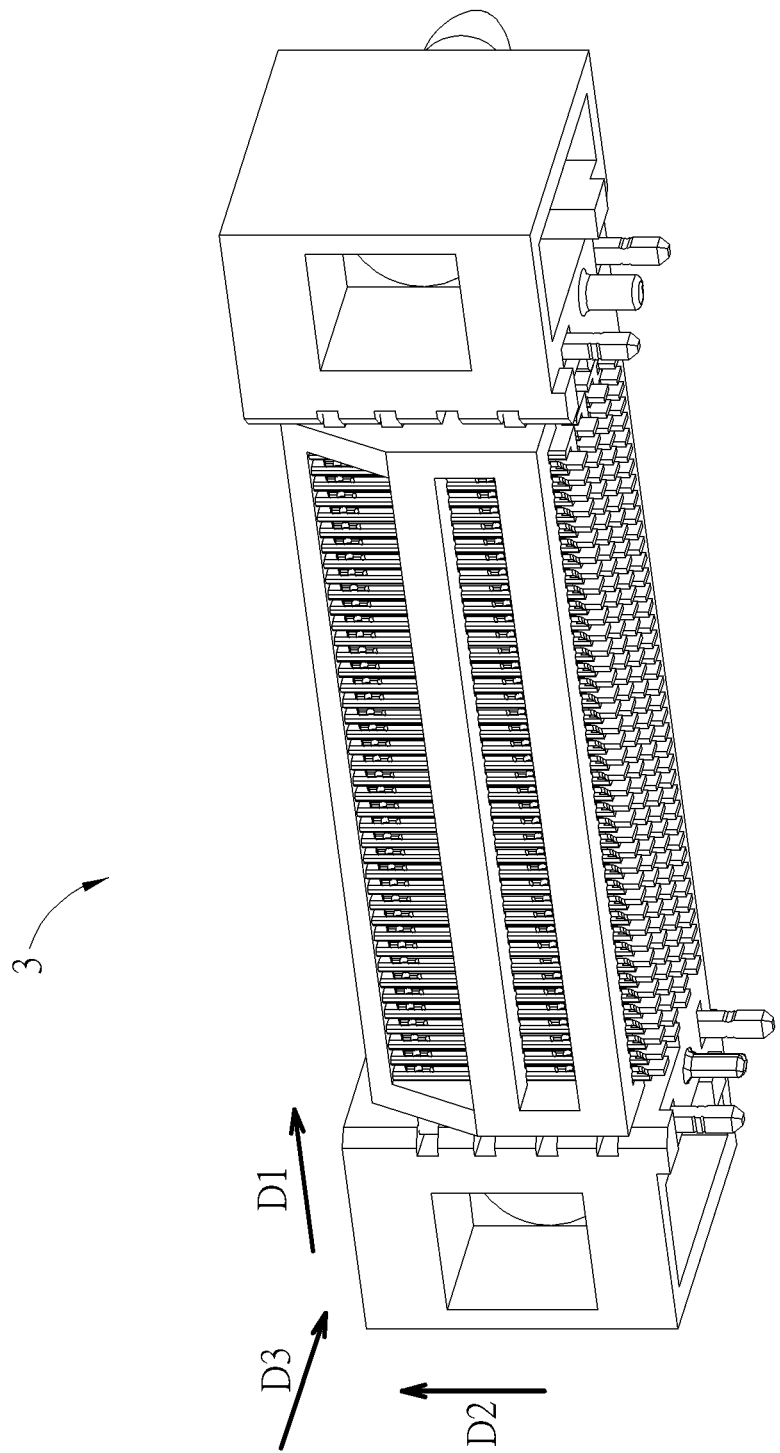
FIG. 21 is a schematic diagram illustrating the electrical connector in FIG. 20 in another view point.

As described above, the electrical connector 1 of the embodiment uses the plurality of fixing parts 14, 18, 22 and 26 to fix the plurality of rows of terminals 12, 16, 20 and 24, so that the terminals 12, 16, 20 and 24 can be stably arranged in high density. The relative position and insulation configuration between terminal 12, 16, 20 and 24 can be accurately designed to provide stable impedance. The electrical connector manufacturing method of the embodiment assembles the plurality of rows of terminals 12, 16, 20 and 24 and the plurality of fixing parts 14, 18, 22 and 26 on the insulation housing 10 in an orderly staggered manner so as to complete the above-mentioned electrical connector 1 with the plurality of rows of terminals. Therefore, the electrical connector manufacturing method can effectively and stably fix the plurality of rows of terminals 12, 16, 20 and 24 to the insulation housing 10, so that the produced electrical connector 1 has a high contact density and stable impedance. Furthermore, the electrical connector 1 of the embodiment is a female connector; however, the invention is not limited thereto. As shown by FIG. 20 and FIG. 21, an electrical connector 3 of another embodiment according to the invention is a male connector. The fixing structure of the terminals of the male connector is the same as that of the electrical connector 1, which will not be repeated in addition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electrical connector manufacturing method, comprising the following steps of:
   (a) providing an insulation housing;
   (b) providing a plurality of first terminals;
   (c) fixing the plurality of first terminals in a row on the insulation housing in a first direction;
   (d) providing a first fixing part;
   (e) after the step (c), assembling the first fixing part to the insulation housing, so that the row of first terminals are structurally constrained between the first fixing part and the insulation housing;
   (f) providing a plurality of second terminals;
   (g) after the step (e), fixing the plurality of second terminals in a row on the insulation housing in the first direction relative to the row of first terminals;
   (h) providing a second fixing part;
   (i) after the step (g), assembling the second fixing part to the insulation housing, so that the row of second terminals are structurally constrained between the second fixing part and the first fixing part;
   (j) providing a plurality of third terminals;
   (k) after the step (i), fixing the plurality of third terminals in a row on the insulation housing in the first direction;
   (l) providing a third fixing part;
   (m) after the step (k), assembling the third fixing part to the insulation housing, so that the row of third terminals are structurally constrained between the third fixing part and the second fixing part;
   (n) providing a plurality of fourth terminals;
   (o) after the step (m), fixing the plurality of fourth terminals in a row on the insulation housing in the first direction relative to the row of third terminals;
   (p) providing a fourth fixing part; and
   (q) after the step (o), assembling the fourth fixing part to the insulation housing, so that the row of fourth terminals are structurally constrained between the fourth fixing part and the third fixing part;
   wherein the row of first terminals, the row of second terminals, and the insulation housing form a first plug-in connection port, the row of third terminals, the row of fourth terminals, and the insulation housing form a second plug-in connection port, the first plug-in connection port and the second plug-in connection port are arranged in a second direction, the first direction is perpendicular to the second direction, and the first plug-in connection port and the second plug-in connection port jointly provide data transmission.

2. The electrical connector manufacturing method according to claim 1, wherein the first fixing part has a first front abutting portion, the second fixing part has a second front abutting portion, the step (e) comprises making the first fixing part abut against the first terminal or the insulation housing through the first front abutting portion in a third direction, the step (i) comprises making the second fixing part abut against the second terminal or the first fixing part through the second front abutting portion in the third direction, and the third direction is perpendicular to the first direction and the second direction.

3. The electrical connector manufacturing method according to claim 2, wherein the first fixing part has a first rear abutting portion, the step (g) comprises making the second terminal abut against the first rear abutting portion, and in the step (i), the second fixing part abuts against the second terminal through the second front abutting portion in the third direction.

4. The electrical connector manufacturing method according to claim 3, wherein the first fixing part has a locating slot, extending in a direction different from the third direction, the first rear abutting portion is located in the locating slot, and the step (g) comprises disposing the second terminal in the locating slot.

5. The electrical connector manufacturing method according to claim 1, wherein the third fixing part has a third front abutting portion, the step (m) comprises making the third fixing part abut against the third terminal or the second fixing part through the third front abutting portion in a third direction, and the third direction is perpendicular to the first direction and the second direction.

6. The electrical connector manufacturing method according to claim 1, wherein the insulation housing has a first engaging structure and a second engaging structure, arranged in the second direction, in the step (e), the first fixing part is detachably connected to the insulation housing through the first engaging structure, and in the step (i), the second fixing part is detachably connected to the insulation housing through the second engaging structure.

7. The electrical connector manufacturing method according to claim 1, after the step (q), further comprising the following steps of:
providing a stencil, the stencil having four rows of through holes;
placing the stencil on the insulation housing, so that the row of first terminals, the row of second terminals, the row of third terminals, and the row of fourth terminals align with the four rows of through holes respectively;
placing a solder ball in each through hole;
heating the solder balls, so that the solder balls are soldered onto distal ends of the row of first terminals, the row of second terminals, the row of third terminals, and the row of fourth terminals; and
removing the stencil.

* * * * *